United States Patent
Horn et al.

(10) Patent No.: US 11,751,133 B2
(45) Date of Patent: Sep. 5, 2023

(54) TECHNIQUES FOR SETTING A QUANTITY OF BITS FOR AN ADAPTIVE LOW-RESOLUTION ANALOG-TO DIGITAL CONVERTER (ADC) IN HIGHER BAND OPERATION

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Amit Bar-Or Tillinger, Tel-Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 17/179,242

(22) Filed: Feb. 18, 2021

(65) Prior Publication Data
US 2022/0264449 A1    Aug. 18, 2022

(51) Int. Cl.
*H04W 52/02*    (2009.01)
*H04L 5/00*     (2006.01)
*H04W 72/044*   (2023.01)

(52) U.S. Cl.
CPC ....... *H04W 52/0212* (2013.01); *H04L 5/0051* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 11,375,527 B1* | 6/2022 | Eyuboglu | .......... H04B 7/15528 |
| 2012/0177139 A1* | 7/2012 | Anto | ................. H04W 72/0453 |
| | | | 375/267 |
| 2013/0155974 A1 | 6/2013 | Papasakellariou et al. | |
| 2014/0254404 A1 | 9/2014 | Ratnakar et al. | |

(Continued)

FOREIGN PATENT DOCUMENTS

EP    3580884 A1    12/2019

OTHER PUBLICATIONS

International Search Report and Written Opinion—PCT/US2022/011048—ISA/EPO—dated Jun. 2, 2022.

(Continued)

*Primary Examiner* — Phirin Sam
(74) *Attorney, Agent, or Firm* — Holland & Hart / Qualcomm

(57) ABSTRACT

This disclosure provides systems, methods and apparatus, including computer programs encoded on computer storage media, for setting a resolution for an analog-to-digital converter (ADC) of a user equipment (UE) based on a modulated reference signal received from a base station (BS) during a first (for example, initial) symbol period of a slot. In one aspect, the first symbol period of the slot and a cyclic prefix (CP) of the first symbol period may be relatively longer in time than other symbol periods and other CPs of the slot and, in some implementations, the BS may transmit a configuration to the UE allocating a portion of the first symbol period for the transmission of the modulated reference signal. The UE may demodulate the modulated reference signal, calibrate an automatic gain control (AGC) of the UE, and set the resolution of the ADC of the UE based on the modulated reference signal.

30 Claims, 9 Drawing Sheets

(56) References Cited

U.S. PATENT DOCUMENTS

| | | | | |
|---|---|---|---|---|
| 2018/0220462 | A1* | 8/2018 | Kusashima | H04W 74/0816 |
| 2018/0288746 | A1* | 10/2018 | Zhang | H04W 74/006 |
| 2019/0067674 | A1* | 2/2019 | Ahn | H01M 4/139 |
| 2019/0075563 | A1* | 3/2019 | Babaei | H04W 72/0446 |
| 2019/0342137 | A1* | 11/2019 | Zhang | H04L 27/2627 |
| 2020/0059337 | A1* | 2/2020 | Yamada | H04W 72/0446 |
| 2020/0074988 | A1* | 3/2020 | Park | G06N 3/006 |
| 2021/0007138 | A1* | 1/2021 | Xu | H04L 5/0044 |
| 2021/0152309 | A1* | 5/2021 | Fei | H04L 5/0058 |
| 2021/0167877 | A1* | 6/2021 | Choi | H04B 17/345 |
| 2021/0360367 | A1* | 11/2021 | Kim | H04W 4/029 |
| 2022/0150937 | A1 | 5/2022 | Kim et al. | |

OTHER PUBLICATIONS

Erik D., et al., "5G NR the Next Generation Wireless Access Technology", 2nd Edition, Chapters 1-17 In: "5G NR", Sep. 18, 2020 (Sep. 18, 2020), Elsevier, XP055908004, 396 Pages, ISBN: 978-0-12-822320-8 pp. 1-611, section 9.11 section 9.11.1.
Partial International Search Report—PCT/US2022/011048—ISA/EPO—dated Apr. 12, 2022.

* cited by examiner

TECHNIQUES FOR SETTING A QUANTITY OF BITS FOR AN ADAPTIVE LOW-RESOLUTION ANALOG-TO DIGITAL CONVERTER (ADC) IN HIGHER BAND OPERATION

TECHNICAL FIELD

The following relates to wireless communications, including techniques for setting a quantity of bits for an adaptive low-resolution analog-to-digital converter (ADC) in higher band operation.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

In some systems, a UE may use an analog-to-digital converter (ADC) for processing over-the-air signaling. Such signal processing may be a primary source of power consumption at the UE. Further, as wireless communications systems continue to increase throughput and system capacity, the UE may be configured to communicate over higher bandwidths, which may further increase the power consumption of the ADC of the UE.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a base station (BS), a configuration of a modulated reference signal for a first orthogonal frequency division multiplexing (OFDM) symbol of a slot, receiving, from the BS, the modulated reference signal in the first OFDM symbol of the slot based on the configuration, demodulating the modulated reference signal according to one or more hypotheses, and receiving, from the BS, a downlink transmission in the slot based on demodulating the modulated reference signal.

Another innovative aspect of the subject matter described in this disclosure can be implemented in an apparatus for wireless communications at a UE. The apparatus may include a first interface, a second interface, and a processing system. The first interface may be configured to obtain, from a BS, a configuration of a modulated reference signal for a first OFDM symbol of a slot. The first interface or a second interface may be configured to obtain, from the BS, the modulated reference signal in the first OFDM symbol of the slot based on the configuration. The processing system may be configured to demodulate the modulated reference signal according to one or more hypotheses. The first interface or the second interface may be configured to obtain, from the BS, a downlink transmission in the slot based on demodulating the modulated reference signal.

Another innovative aspect of the subject matter described in this disclosure can be implemented in another apparatus for wireless communications at a UE. The apparatus may include a processor, memory coupled with the processor, and instructions stored in the memory. The instructions may be executable by the processor to cause the apparatus to receive, from a BS, a configuration of a modulated reference signal for a first OFDM symbol of a slot, receive, from the BS, the modulated reference signal in the first OFDM symbol of the slot based on the configuration, demodulate the modulated reference signal according to one or more hypotheses, and receive, from the BS, a downlink transmission in the slot based on demodulating the modulated reference signal.

Another innovative aspect of the subject matter described in this disclosure can be implemented in another apparatus for wireless communications at a UE. The apparatus may include means for receiving, from a BS, a configuration of a modulated reference signal for a first OFDM symbol of a slot, means for receiving, from the BS, the modulated reference signal in the first OFDM symbol of the slot based on the configuration, means for demodulating the modulated reference signal according to one or more hypotheses, and means for receiving, from the BS, a downlink transmission in the slot based on demodulating the modulated reference signal.

Another innovative aspect of the subject matter described in this disclosure can be implemented in a non-transitory computer-readable medium storing code for wireless communications at a UE. The code may include instructions executable by a processor to receive, from a BS, a configuration of a modulated reference signal for a first OFDM symbol of a slot, receive, from the BS, the modulated reference signal in the first OFDM symbol of the slot based on the configuration, demodulate the modulated reference signal according to one or more hypotheses, and receive, from the BS, a downlink transmission in the slot based on demodulating the modulated reference signal.

One innovative aspect of the subject matter described in this disclosure can be implemented in a method for wireless communications at a BS. The method may include transmitting, to a UE, a configuration of a modulated reference signal for a first OFDM symbol of a slot, transmitting, to the UE, the modulated reference signal in the first OFDM symbol of the slot based on the configuration, and transmitting, to the UE, a downlink transmission in the slot based on transmitting the modulated reference signal.

Another innovative aspect of the subject matter described in this disclosure can be implemented in an apparatus for wireless communications at a BS. The apparatus may include a first interface, a second interface, and a processing system. The first interface may be configured to output, to a UE, a configuration of a modulated reference signal for a first OFDM symbol of a slot. The first interface or a second interface may be configured to output, to the UE, the modulated reference signal in the first OFDM symbol of the slot based on the configuration. The first interface or the second interface may be configured to output, to the UE, a downlink transmission in the slot based on outputting the modulated reference signal.

Another innovative aspect of the subject matter described in this disclosure can be implemented in another apparatus for wireless communications at a BS. The apparatus may include a processor, memory coupled with the processor, and instructions stored in the memory. The instructions may be executable by the processor to cause the apparatus to transmit, to a UE, a configuration of a modulated reference signal for a first OFDM symbol of a slot, transmit, to the UE, the modulated reference signal in the first OFDM symbol of the slot based on the configuration, and transmit, to the UE, a downlink transmission in the slot based on transmitting the modulated reference signal.

Another innovative aspect of the subject matter described in this disclosure can be implemented in another apparatus for wireless communications at a BS. The apparatus may include means for transmitting, to a UE, a configuration of a modulated reference signal for a first OFDM symbol of a slot, means for transmitting, to the UE, the modulated reference signal in the first OFDM symbol of the slot based on the configuration, and means for transmitting, to the UE, a downlink transmission in the slot based on transmitting the modulated reference signal.

Another innovative aspect of the subject matter described in this disclosure can be implemented in a non-transitory computer-readable medium storing code for wireless communications at a BS. The code may include instructions executable by a processor to transmit, to a UE, a configuration of a modulated reference signal for a first OFDM symbol of a slot, transmit, to the UE, the modulated reference signal in the first OFDM symbol of the slot based on the configuration, and transmit, to the UE, a downlink transmission in the slot based on transmitting the modulated reference signal.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
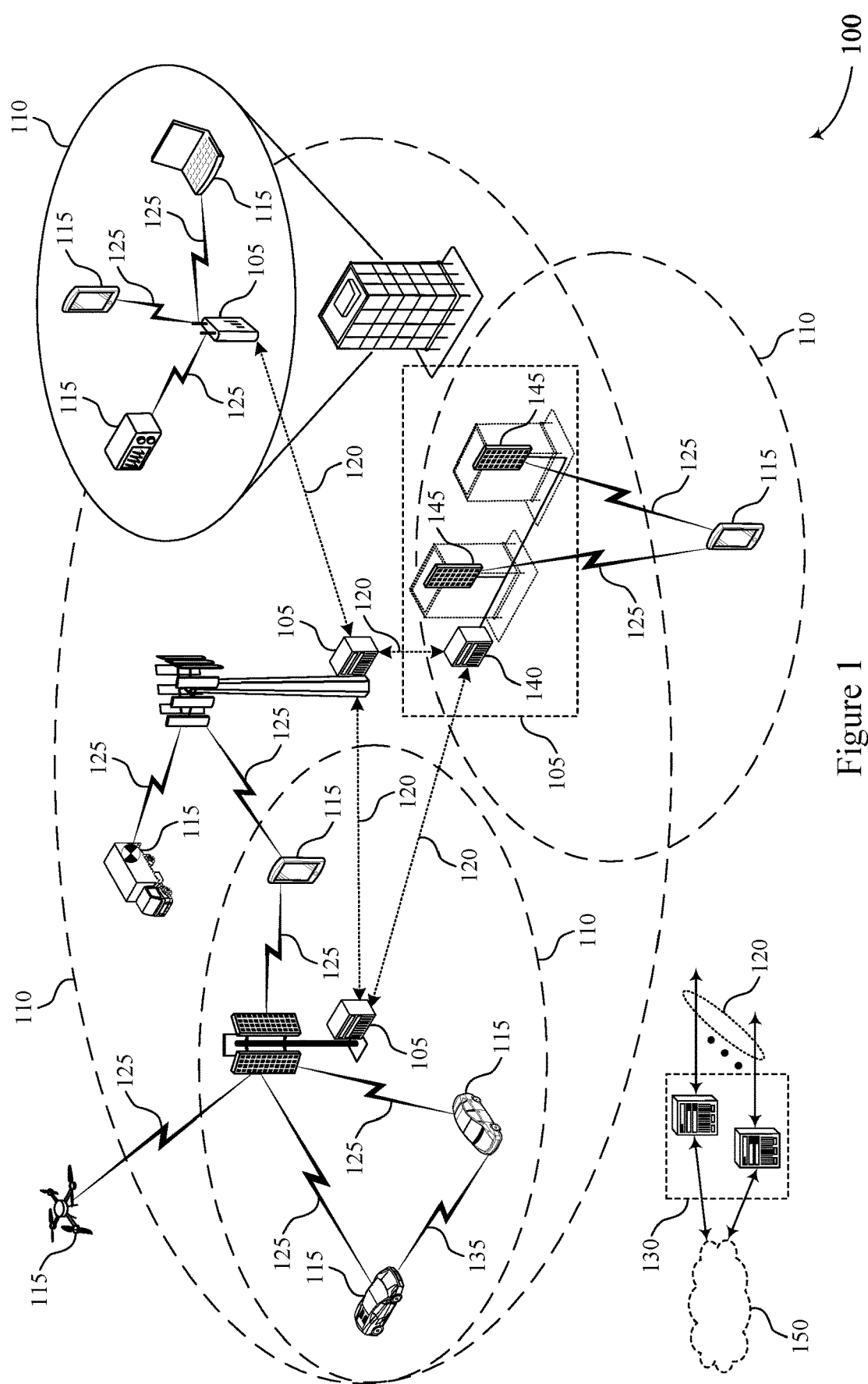
FIG. 1 illustrates an example of a wireless communications system that supports techniques for setting a quantity of bits for an adaptive low-resolution analog-to-digital converter (ADC) in higher band operation.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

An analog-to-digital converter (ADC) of a user equipment (UE) may be a primary source of UE power consumption when processing signaling received over-the-air. Additionally, as wireless communications systems continue to increase throughput and system capacity, communication may occur at higher bandwidths, which may further increase ADC power consumption. For example, a sampling frequency of the ADC may increase with bandwidth, and the power consumption of the ADC may in turn increase with the sampling frequency of the ADC. To improve or otherwise control a tradeoff between performance and power consumption, a dynamic approach for setting a resolution of the ADC may be desired. In some systems, however, the UE may set the resolution of the ADC based on information received in a downlink control transmission, such as downlink control information (DCI) or DCI messaging. Such systems may experience unnecessary latency in setting the ADC resolution due to the decoding time of the DCI, which may result in a relatively poor or sub-optimal ADC resolution during the period prior to the decoding of the DCI.

In some implementations of the present disclosure, the UE may receive a reference signal from a base station (BS) during a portion of a first (for example, initial) symbol period of a slot that is sometimes used for an extended cyclic prefix (CP) and may set the resolution of the ADC based on the reference signal (without waiting to decode the DCI). For example, an initial symbol period of a slot may include an extended CP that is longer in time than CPs of other symbols in the slot, and the BS may transmit the reference signal during such an extended CP. In some examples, the UE may use the reference signal (or information obtained based on demodulating or measuring the reference signal) to obtain convergence of an automatic gain control (AGC) of the UE. The UE, based on obtaining the convergence of the AGC using the reference signal, may set a resolution of the ADC within a shorter timeline than the UE may have otherwise achieved using a DCI-based approach.

In some examples, the UE may achieve the AGC conversion based on measuring the reference signal and estimating interference that may adversely influence the performance of the AGC. Further, the UE may demodulate the reference signal according to one or more correlator hypotheses, select a correlator hypothesis having a strongest peak correlation with the reference signal, and may use the peak correlation to estimate a timing offset or a frequency offset associated with a downlink transmission from the BS. In some implementations, the BS may include additional information, such as information relating to a physical downlink shared channel (PDSCH) constellation, in the reference signal and the UE may likewise obtain such additional information based on demodulating the reference signal. Accordingly, the UE, using the ADC resolution that is set based on the reference signal and based on any other information conveyed by the reference signal, may receive a downlink transmission (a PDSCH transmission) from the BS.

Particular implementations of the subject matter described in this disclosure can be implemented to realize one or more of the following potential advantages. For example, based on achieving AGC convergence and setting the resolution for the ADC of the UE within a shorter timeline than may have otherwise been achieved using a DCI-based approach, the UE may employ a more accurate ADC resolution for any symbol period received prior to the decoding of the DCI. As such, the UE may dynamically set the ADC resolution based on current channel conditions, which may reduce or optimize the power consumption of the ADC and result in reduced UE baseband power consumption, greater power savings, and longer battery life at the UE. Further, in implementations in which the BS includes additional information, such as the PDSCH constellation, in the reference signal, the BS may reduce an overhead associated with a physical downlink control channel (PDCCH) transmission (which may have otherwise carried such additional information), which may result in increased throughput between the UE and the BS. Such increased throughput between the UE and the BS may further result in or otherwise be associated with greater spectral efficiency, increased data rates, and increased system capacity.

FIG. 1 illustrates an example of a wireless communications system 100 that supports techniques for setting a quantity of bits for an adaptive low-resolution ADC in higher band operation. The wireless communications system 100 may include one or more BSs 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a geographic coverage area 110 over which the UEs 115 and the BS 105 may establish one or more communication links 125. The geographic coverage area 110 may be an example of a geographic area over which a BS 105 and a UE 115 may support the communication of signals according to one or more radio access technologies.

The UEs 115 may be dispersed throughout a geographic coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (for example, core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (for example, via an S1, N2, N3, or other interface). The BSs 105 may communicate with one another over the backhaul links 120 (for example, via an X2, Xn, or other interface) either directly (for example, directly between BSs 105), or indirectly (for example, via core network 130), or both. In some examples, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier also may have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (for example, of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the BSs 105, the UEs 115, or both) may have hardware configurations that support communications over a particular carrier bandwidth or may be configurable to support communications over one of a set of carrier bandwidths. In some examples, the wireless communications system 100 may include BSs 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (for example, a duration of one modulation symbol) and one subcarrier, where the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each BS 105 may provide communication coverage via one or more cells, for example a macro cell, a small cell, a hot spot, or other types of cells, or any combination thereof. The term "cell" may refer to a logical communication entity used for communication with a BS 105 (for example, over a carrier) and may be associated with an identifier for distinguishing neighboring cells (for example, a physical cell identifier (PCID), a virtual cell identifier (VCID), or others). In some examples, a cell also may refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the BS 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered BS 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A BS 105 may support one or multiple cells and also may support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a BS 105 may be movable and therefore provide communication coverage for a moving geographic coverage area 110. In some examples, different geographic coverage areas 110 associated with different technologies may overlap, but the different geographic coverage areas 110 may be supported by the same BS 105. In some other examples, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

The wireless communications system 100 may support synchronous or asynchronous operation. For synchronous operation, the BSs 105 may have similar frame timings, and transmissions from different BSs 105 may be approximately aligned in time.

For asynchronous operation, the BSs 105 may have different frame timings, and transmissions from different BSs 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a BS 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable or low-latency functions. Ultra-reliable communications may include private communication or group communication and may be supported by one or more services such as push-to-talk (MCPTT), video (MCVideo), or data (MCData). Support for functions may include prioritization of services, and services may be used for public safety or general commercial applications. The terms ultra-reliable, low-latency, and ultra-reliable low-latency may be used interchangeably herein.

In some examples, a UE 115 also may be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some examples, groups of the UEs 115 communicating via D2D communications may utilize a one-to-many (1-M) system in which each UE 115 transmits to every other UE 115 in the group. In some examples, a BS 105 facilitates the scheduling of resources for D2D communications. In other cases, D2D communications are carried out between the UEs 115 without the involvement of a BS 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, BSs 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (for example, radio heads and ANCs) or consolidated into a single network device (for example, a BS 105).

The wireless communications system 100 may operate using one or more frequency bands, such as frequency bands in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the BSs 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some examples, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (for example, a BS 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (for example, by a transmitting device, such as a BS 105, or by a receiving device, such as a UE 115) a beam direction for transmission or reception by the BS 105.

Some signals, such as data signals associated with a particular receiving device, may be transmitted by a BS 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (for example, by a BS 105 or a UE 115) may be performed using multiple beam directions, and the device may use a combination of digital precoding or radio frequency beamforming to generate a combined beam for transmission (for example, from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may process signals received over-the-air using an ADC of the UE 115. For example, the UE 115 may receive a transmission from another device, such as a downlink transmission from a BS 105, as an analog signal and may use the ADC to covert the analog signal into a digital signal. The analog signal may be or may be represented by a waveform and the UE 115 may use the ADC to covert the waveform into digital values, sometimes represented by a bit sequence. In some examples, the ADC may be a primary source of power consumption at the UE 115, and the UE 115 may employ a low-resolution ADC to reduce the power consumption of the ADC as well as to reduce the power consumption of a following digital-front-end (DFE) because the DFE may process a baseband signal with a lower number of bits based on the lower ADC resolution. As wireless communications systems, such as the wireless communications system 100, prioritize throughput and system capacity, the UE 115 may be configured to communicate over higher and wider bandwidths. Such wider bandwidths may influence a sampling frequency of the ADC, which may result in an increase in the power consumption of the ADC (as ADC power consumption may be linear with the sampling frequency).

In some implementations of the present disclosure, the UE 115 may achieve greater control of a tradeoff between performance and power consumption based on using a dynamic approach for setting the ADC resolution (for example, setting the ADC resolution based on current channel conditions or deployment scenarios, as opposed to setting the ADC resolution based on a relatively static configuration). In some implementations, to achieve such greater control of the tradeoff between performance and power consumption, the UE 115 may receive a modulated reference signal from a BS 105 and use the modulated reference signal for convergence of an AGC of the UE 115. The AGC convergence of the UE 115 may be used to set the resolution for the ADC. Accordingly, the UE 115 may receive and process downlink transmissions from the BS 105 using the ADC resolution set based on the modulated reference signal.

Figure 2:
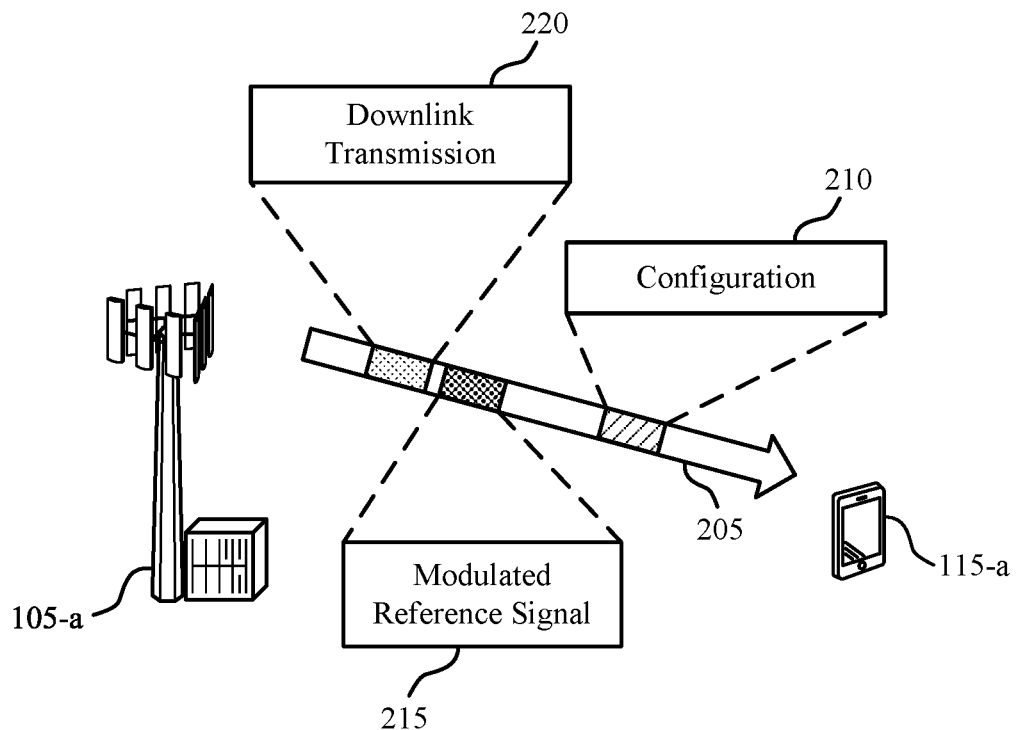
FIG. 2 illustrates an example of a signaling diagram that supports techniques for setting a quantity of bits for an adaptive low-resolution ADC in higher band operation.

FIG. 2 illustrates an example of a signaling diagram 200 that supports techniques for setting a quantity of bits for an adaptive low-resolution ADC in higher band operation. The signaling diagram 200 may implement or be implemented to realize aspects of the wireless communications system 100. For example, the signaling diagram 200 may illustrate communications between a UE 115-a and a BS 105-a, which may be examples of corresponding devices described herein, including with reference to FIG. 1. In some examples, the UE 115-a may receive a modulated reference signal 215 and may use the modulated reference signal 215 for setting or configuring a resolution of an ADC of the UE 115a.

The UE 115-a may use an ADC to process over-the-air signaling received from the BS 105-a (to convert a waveform signal into digital values, such as a bit sequence). The ADC, however, may consume a significant amount of power of the UE 115-a. Additionally, a DFE following the ADC of the UE 115-a also may consume a significant amount of power of the UE 115-a. Further, while ADC and DFE power consumption presents operational challenges over LTE and 5G-NR radio frequencies (such as sub-6 GHz, or any other radio frequency), these operational challenges may become more prominent as devices communicate over increasingly high frequency or increasingly large bandwidths. For example, as wireless communications systems aim to increase throughput and capacity, devices (such as the UE 115-a and the BS 105-a) may transmit or receive over higher frequency ranges or over larger bandwidths (such as over FR4, FR5, or 6G radio frequencies, for example, sub-THz and beyond radio frequencies).

Communication over such higher frequency ranges or larger bandwidths may be associated with an increase in a sampling frequency (or a reduction in time between samples) at the ADC of the UE 115-a, which may result in the more prominent operational challenges associated with the increase in power consumption of the ADC. For example, the power consumption of the ADC of the UE 115-c may increase in proportion to (such as linearly with) the sampling frequency and, at higher frequencies or larger bandwidths, the ADC may process a greater number of bits per second, which may result in more power consumption as the number of bits for the ADC to multiply increases. As such, a tradeoff between power consumption by the ADC performance (such as throughput and system capacity) emerges such that for an increase or decrease in performance the ADC of the UE 115-a may experience a corresponding increase or decrease in power consumption. The UE 115-a, however, may be unable to adjust the resolution of the ADC based on sampling rate or channel conditions, which may result in the UE 115-a being unable to optimize or control the tradeoff between performance and power consumption. In other words, a dynamic approach for setting or configuring the ADC resolution may be desirable to optimize the tradeoff between performance of the UE 115-a and power consumption of the ADC of the UE 115-a.

In some aspects, however, the UE 115-a may set or configure the resolution of the ADC in a latency-afflicted manner. For example, the UE 115-a may set or configure the resolution of the ADC based on a downlink control transmission, such as DCI, from the BS 105-a. For instance, if the BS 105-a transmits DCI indicating or otherwise conveying a number of bits for the UE 115-a to use to open the ADC in a first (for example, initial) OFDM symbol of a slot, the UE 115-a may capture the samples of the first symbol, find hypotheses of the PDCCH in the first symbol, decode the information (bits) carried by the PDCCH, and select, determine, or otherwise identify the number of bits to use to open the ADC based on the decoding. Such a DCI-based approach for setting the ADC resolution may take a relatively long duration in time, such as half a slot, and the UE 115-a may process any signaling received from the BS 105-a during OFDM symbols prior to the setting of the ADC resolution according to a potentially less suitable ADC resolution. For example, for any OFDM symbols received prior to the decoding of the DCI, the UE 115-a may use an ADC resolution associated with a relatively higher power consumption for a current performance level (a current throughput based on an operating bandwidth or current channel conditions) than may be achievable. In other words, the power consumption of the ADC of the UE 115-a may be skewed or different from a lower or more optimal power consumption for the duration of the OFDM symbol periods received prior to the setting of the DCI-based ADC resolution.

In some implementations, the BS 105-a may transmit a modulated reference signal 215 to the UE 115-a that carries or otherwise conveys information for the UE 115-a to use for dynamically setting the resolution of the ADC. For example, the UE 115-a, based on receiving and measuring the modulated reference signal 215, may select or otherwise determine a number of bits to use to open the ADC (a number of bits to use as a resolution of the ADC). In other words, the UE 115-*a* may receive and measure the modulated reference signal 215 and obtain information that the UE 115-*a* may use for convergence to the number of bits to use for the resolution of the ADC. In some examples, the UE 115-*a* may use the modulated reference signal 215 to achieve AGC convergence, which may be a key component for dynamically setting the resolution of the ADC.

In some aspects, the BS 105-*a* may transmit the modulated reference signal 215 to the UE 115-*a* in a first (for example, initial) symbol period of a slot and in a portion of the first symbol period that sometimes carries a CP of the symbol period. For example, each symbol period (if not all) of a slot may include a CP at a beginning of each symbol period that spans some time duration, and the CP at the beginning of the first symbol period of the slot may include an extended CP such that the time duration spanned by the CP of the first symbol period is relatively longer than the time duration spanned by CPs of other symbol periods of the slot. Additional details relating to such an extended CP in the first symbol period of the slot are described herein, including with reference to FIG. 3.

The UE 115-*a*, based on receiving the modulated reference signal 215 in the portion of the first symbol period sometimes used for the CP, may achieve AGC conversion and select the resolution for the ADC prior to other symbol periods of the slot (which may be associated with a lower latency than the DCI-based approach). For example, the UE 115-*a* may receive the modulated reference signal 215 at the beginning of the slot for low latency demodulation (such as within a few microseconds). Further, the first symbol period of the slot, which may carry or contain a PDCCH transmission, may be associated with a relatively small number of ADC bits as compared to other symbol periods of the slot.

In some implementations, the modulated reference signal 215 may include or be an example of a time domain sequence, such as a Zadoff-Chu sequence, a Gold sequence, or a Walsh code, among other examples of any other time domain sequence. In some examples, for the UE 115-*a* to demodulate accurate or correct modulated data of the modulated reference signal 215, the UE 115-*a* may apply an auto-correlation on a chosen sequence (a chosen time domain sequence). Further, in some examples, the modulated reference signal 215 may not include coding or decoding information, which may reduce latency associated with the setting of the ADC of the UE 115-*a* based on the modulated reference signal 215.

In some examples, the UE 115-*a* may receive the modulated reference signal 215 based on a configuration 210 of the modulated reference signal 215. For example, the BS 105-*a* may transmit the configuration 210 of the modulated reference signal 215 to the UE 115-*a* indicating how the UE 115-*a* is to receive the modulated reference signal 215 or over which resources the UE 115-*a* may monitor for the modulated reference signal 215, or both. For instance, the configuration 210 may include a resource allocation for the modulated reference signal 215 (such as which resources of the first symbol period of the slot include the modulated reference signal 215) or a symbol configuration of the first symbol period during which the BS 105-*a* transmits the modulated reference signal 215. Additionally, or alternatively, the configuration 210 may indicate a periodicity of the modulated reference signal 215. For example, the BS 105-*a* may transmit the modulated reference signal 215 per slot or per several slots (such as every other slot, every third slot, or every fourth slot). In some implementations, the BS 105-*a* may configure or adjust the periodicity of the modulated reference signal 215 based on a decision at the BS 105-*a* or based on channel conditions between the UE 115-*a* and the BS 105-*a* (such as a change in the environment or a change in a modulation and coding scheme (MCS), among other examples). In some aspects, the BS 105-*a* may transmit the configuration 210 to the UE 115-*a* via downlink control signaling, such as RRC signaling. Additional details relating to the configuration 210 of the modulated reference signal 215 are described herein, including with reference to FIG. 4.

In some examples, the BS 105-*a* may transmit the modulated reference signal 215 over a bandwidth that is similar to (but may not be the same as) a bandwidth of a downlink transmission 220, such as a physical downlink shared channel (PDSCH) transmission, in other symbols of the slot. In such examples, the UE 115-*a* may use the similar bandwidth for measuring an SNR, estimating any blockers, or for AGC convergence. Such blockers may include or refer to transmissions (from one or more other UEs 115) in adjacent subcarriers that may cause interference on communication between the UE 115-*a* and the BS 105-*a* because of, for example, a frequency offset, a leakage, or other conditions. In other words, a blocker may refer to a transmission over resource elements that are non-overlapping with resource elements used by the UE 115-*a* and the BS 105-*a* but that still causes interference on the resource elements used by the UE 115-*a* and the BS 105-*a*.

To measure the blockers, the UE 115-*a* may open the ADC of the UE 115-*a* at a higher bandwidth (a higher sampling frequency) and measure a first energy of transmissions over resources that are out-of-band of the downlink transmission 220. The UE 115-*a* may additionally measure a second energy over resources that are in-band of the downlink transmission 220 (which may be equivalently referred to as an occupied bandwidth) based on narrowing the bandwidth (the sampling frequency) of the ADC and measuring the modulated reference signal 215. As such, the UE 115-*a* may calculate or estimate the blockers (interference) that may potentially influence the downlink transmission 220 based on finding a difference or a ratio between the first energy and the second energy.

Additionally, or alternatively, in examples in which the UE 115-*a* uses the relatively larger bandwidth for AGC convergence, the UE 115-*a* may (initially) sample the modulated reference signal 215 (an analog signal) at a relatively higher sampling rate such that the AGC of the UE 115-*a* may detect or measure energy from other transmissions in nearby frequencies (which may be in-band or out-of-band of the frequency band over which the downlink transmission 220 is transmitted). Accordingly, the UE 115-*a* may calibrate a gain of the AGC based on the relatively higher sampling rate. To avoid detecting or measuring such other transmissions (or to account for interference from such other transmissions), the UE 115-*a* may re-calibrate the AGC once the modulated reference signal 215 is lowered to the OFDM sampling rate (such as the sampling rate associated with the bandwidth of the downlink transmission 220) such that the gain of the AGC is re-calibrated for the next samples.

As such, the UE 115-*a* may measure an energy of the modulated reference signal 215 at both the relatively higher sampling rate and at the OFDM sampling rate (the relatively lower sampling rate) and may detect the energy obtained from other transmissions based on comparing the different energy measurements. For example, the UE 115-*a* may measure an energy gap or ratio between the measurement of the modulated reference signal 215 at the relatively higher sampling rate and the measurement of the modulated reference signal 215 at the OFDM sampling rate to detect the energy from the other transmissions. The UE 115-a may use the detected energy from the other transmissions (or the energy gap or ratio) for various processing operations or algorithms at the UE 115-a. The UE 115-a, based on estimating the blockers using the modulated reference signal 215, may use such knowledge of the estimated blockers for receiving and decoding the downlink transmission 220 in one or more other symbol periods of the slot.

In some implementations, the BS 105-a may employ FDM for transmitting the modulated reference signal 215 to the UE 115-a. For example, the BS 105-a may transmit a modulated reference signal 215 to each of a number of UEs 115 including the UE 115-a and the BS 105-a may add or otherwise include a radio network temporary identifier (RNTI) (in full or in part) associated with each UE 115 to enable the number of UEs 115 to receive the modulated reference signal 215 over a same resource (such as a same time and frequency resource). For example, the UE 115-a may monitor for a portion of the modulated reference signal 215 including an RNTI associated with the UE 115-a and may demodulate that portion of the modulated reference signal 215 including the RNTI associated with the UE 115-a. In some other implementations, the UE 115-a may demodulate an entirety of the modulated reference signal 215 without monitoring for a portion of the modulated reference signal 215 including an RNTI associated with the UE 115-a. In some aspects, whether or not the UE 115-a monitors for an RNTI associated with the UE 115-a in the modulated reference signal 215 may be based on the configuration 210 of the modulated reference signal, as described in more detail with reference to FIG. 4.

The UE 115-a may demodulate the modulated reference signal 215 based on using a correlator hypothesis and choosing or selecting a strongest peak correlation. In some examples, the UE 115-a may use the peak correlation to assist with other PDCCH or PDSCH detectors, such as a symbol timing offset (STO) or a carrier frequency offset (CFO). Additionally, or alternatively, the UE 115-a may use the peak correlation to estimate a signal-to-interference-plus-noise ratio (SINR) or SNR based on obtaining an area (a time and frequency resource area) in which there is unlikely to be energy from the modulated reference signal 215 (such that noise is exclusively present). From the measured noise, the UE 115-a may, in some examples, calculate a noise variance. In some examples, the UE 115-a may determine whether or not the UE 115-a may succeed (or is likely to succeed) a decoding or demodulating procedure for the downlink transmission 220 based on the estimated SINR or SNR.

In some implementations, the UE 115-a may attempt to detect and demodulate the modulated reference signal 215 using a detector and according to one or more hypotheses. In some aspects, a probability for successful detection of the modulated reference signal 215 by the UE 115-a may be based on a number of M possible hypotheses according to which the UE 115-a may attempt to demodulate the modulated reference signal 215. An upper bound detection probability for one hypothesis of the M possible hypotheses is described herein. Such a detection probability may be denoted as $P_D(y|h)$, in which y may refer to the received samples and h may refer to the channel (such as a non-fading channel, as it may not be dependent on samples). The received samples y may be defined by Equation 1, shown below.

$$y = hp_t + n | H_t \sim N(hp_t, \sigma_n I_{n \times n}) \qquad (1)$$

As shown by Equation 1, $p_t$ is a scrambling sequence (which is unknown and the UE 115 may test hypotheses on the scrambling sequence), n is a noise factor (and may include or refer to complex noise), and $H_t$ is the hypothesis that is defined as transmitted (the hypothesis for which the detection probability $P_D(y|h)$ is calculated). As also shown by Equation 1, a distribution of $H_t$ may be modeled as normal noise (such as Gaussian noise). An average of the distribution may be defined as $hp_t$ (the channel multiplied by the scrambling sequence) and a variance of the distribution may be defined as $\sigma_n I_{n \times n}$. In some aspects, Equation 1 is defined based on assuming that one hypothesis is transmitted, assuming a static channel, and assuming no correlation.

The maximum likelihood (ML) and the maximum a posteriori probability (MAP) solutions may be achieved, calculated, or otherwise found based on calculating the $\mathrm{argmax}_{t \in M} P(y|H_t)$, which may be understood as the argmax of all of the hypotheses for the samples y. In other words, the probability for detection of the samples y given the hypotheses $H_t$ may be found based on searching for a hypothesis t out of the known number of hypotheses M. In some aspects, the number of hypotheses M may be less than a number of sequences N because the UE 115 may have knowledge or assume that some of the bits of the modulated reference signal 215 convey an RNTI (a known) and that some other bits of the modulated reference signal 215 convey a constellation (an unknown).

The detection probability $P_D(y|h)$ (the probability of y given h), following $\mathrm{argmax}_{t \in M} P(y|H_t)$, may be calculated as shown by Equation 2, shown below.

$$P_D(y|h) = \sum_{p=1}^{M} P_D(y|H_p, h) \frac{1/M}{P(H_p)} \qquad (2)$$

$$= P\left(\bigcap_{\forall t \in M, t \neq p} P(y|H_p) > P(y|H_t) \bigg| H_p\right)$$

As shown by Equation 2, the $P_D(y|h)$ may be defined by a summation of $P_D(y|H_p, h)$ (probabilities of y given hypotheses $H_p$) multiplied by the probability of each hypothesis $P(H_p)$. If a uniform distribution is assumed, $P(H_p) = 1/M$. Further, the $P_D(y|h)$ may be defined based on calculating the probability of a correct hypothesis $P(y|H_p)$ (in which the subscript p may denote a correct hypothesis) that is greater than all other hypotheses $P(|H_t)|H_p$ jointly if searching for all t (within M) that are not equal to p given that the p hypothesis is the correct hypothesis. In some aspects, Equation 2 may be derived from $\mathrm{argmax}_{t \in M}(y|H_t)$ or may be understood as a likelihood ratio test if assuming a uniform distribution.

In some examples, it may be assumed that all likelihood tests are uncorrelated (because, for example, the sequences may be independent and identically distributed (iid) sequences) for some number of hypotheses (such as for two hypotheses). As such, the solutions of Equation 2 may be greater than or equal to (may be equal for two hypotheses) some other probability, as defined by Equation 3, shown below.

$$P\left(\bigcap_{\forall t \in M, t \neq p} P(y|H_p) > P(y|H_t) \bigg| H_p\right) \geq \qquad (3)$$

-continued $$\prod_{\forall t \in C, t \neq p} P(P(y \mid H_p) > P(y \mid H_t) \mid H_p)$$

For example, if each probability of a hypothesis $P(y|H_p)$ that is greater than $P(y|H_t)H_p$ is found and multiplied together, that product will be less than or equal to $P_D(y|h)$. In other words, a product of a probability of a correct hypothesis and a probability bigger than other hypotheses can be calculated to find a probability that is less than or equal to $P_D(y|h)$. In some examples, such as in examples in which Gaussian noise distribution is assumed, $P(y|H_p)$ and $P(y|H_t)|H_p$ can be expanded as defined by Equation 4 and Equation 5, respectively, shown below.

$$P(y \mid H_p) = \frac{1}{\left(\sqrt{2\pi}\,\sigma_n\right)^N} \exp\left(-\frac{(y-hp)^2}{2\sigma_n^2}\right) \quad (4)$$

$$P(y \mid H_t) \mid H_p = \frac{1}{\left(\sqrt{2\pi}\,\sigma_n\right)^N} \exp\left(-\frac{(y-ht)^2}{2\sigma_n^2}\right) \quad (5)$$

As such, the expansions defined by Equation 4 and Equation 5 may be substituted into Equation 3 and solved algebraically to obtain an analytically derived detection probability upper bound defined by Equation 6, as shown below.

$$\prod_{\forall t \in C, t \neq p} P(P(y \mid H_p) > P(y \mid H_t) \mid H_p) = \quad (6)$$

$$\prod_{\forall t \in C, t \neq p} P\left(\frac{1}{\left(\sqrt{2\pi}\,\sigma_n\right)^N}\exp\left(-\frac{(y-hp)^2}{2\sigma_n^2}\right) > \frac{1}{\left(\sqrt{2\pi}\,\sigma_n\right)^N}\exp\left(-\frac{(y-ht)^2}{2\sigma_n^2}\right)\right) =$$

$$\prod_{\forall t \in C, t \neq p} P\left(\left(-\frac{(y-hp)^*(y-hp)}{2\sigma_n^2}\right) - \left(-\frac{(y-ht)^*(y-ht)}{2\sigma_n^2}\right) > 0\right) =$$

$$\prod_{\forall t \in C, t \neq p} P\left(\frac{2Re\{y^*h(p-t)\} - |h|^2(\underbrace{p^*p - t^*t}_{0})}{2\sigma_n^2} > 0\right) =$$

$$\prod_{\forall t \in C, t \neq p} P(Re\{y^*h(p-t)\} > 0 \mid H_p) = \prod_{\forall t \in C, t \neq p} P(Re\{(hp+n)^*h(p-t)\} > 0) =$$

$$\prod_{\forall t \in C, t \neq p} P\left(|h|^2\left(|p|^2 - Re\{\underbrace{p^*t}_{cross\ seq\ corr}\}\right) + \frac{Re\{hn^*(p-t)\}}{\sim N\left(0, \frac{|h|^2|p-t|^2\sigma_n^2}{2}\right)} > 0\right) =$$

$$\prod_{\forall t \in C, t \neq p} P(Re\{hn^*(p-t)\} > -|h|^2(|p|^2 - Re\{p^*t\})) =$$

$$\prod_{\forall t \in C, t \neq p} Q\left(\frac{-\sqrt{2}\,|h|(|p|^2 - Re\{p^*t\})}{|p-t|\sigma_n}\right) =$$

$$\prod_{\forall t \in C, t \neq p} Q\left(-\sqrt{2SNR}\,\frac{(N_{ZC} - Re\{p^*t\})}{|p-t|}\right)$$

As shown in the above analytical solution for the detection probability upper bound, x* may refer to a conjugate of x, the Q function may be defined when Gaussian noise $Re\{hn^*(p-t)\}$ is greater than something (such as $|h|^2(|p|^2 - Re\{p^*t\})$), $|h|/\sigma_n = \sqrt{SNR}$ (the square root of SNR), $N_{zc}$ may be understood as a size of a Zadoff-Chu sequence (and may be replaced with another term if a different time domain sequence is used), and p*t may be understood as the correlation. As such, Equation 6 may represent an upper bound for the probability of the UE 115-a to detect the modulated reference signal 215. In some examples, the UE 115-a may experience a relatively low miss detection probability if SNR is greater than 0 dB and with a low number of sequence samples (such as 7 or 17 samples). If an SNR is relatively low, such as below a threshold SNR, the UE 115-a may perform a relation detector between hypotheses and may determine that the UE 115-a is in a low SNR scenario based on the relation detector. In such examples in which the UE 115-a is in a low SNR scenario, the UE 115-a may use a relatively lower number of ADC bits (which may conserve power). In some aspects, the analytical result defined by Equation 6 may deviate or differ from an actual detection probability or from a numerical detection probability.

Accordingly, the UE 115-a may, in some examples, successfully detect and demodulate the modulated reference signal 215. In some implementations, the modulated reference signal 215 (such as preamble data of the modulated reference signal 215) may include or convey information associated with the PDSCH or the ADC of the UE 115-a, or both. For example, the modulated reference signal 215 may include a PDSCH constellation (which may reduce overhead of the PDCCH), a current slot MCS, a number of bits from the ADC, a partial or full RNTI, or a combination thereof, among other examples. In examples in which the modulated reference signal 215 includes an indication of the MCS, the modulated reference signal 215 may indicate a single MCS or a range of MCSs. For example, using two bits, the modulated reference signal 215 may indicate that the MCS is between MCS 0 and MCS 7, that the MCS is between MCS 8 and MCS 12, that the MCS is between MCS 13 and MCS 18, or that the MCS is between MCS 19 and MCS 28

(such that a number value of an MCS corresponds to an entry or index of a table, such as an MCS table). The BS 105-*a* may similarly indicate a single PDSCH constellation or a range of PDSCH constellations via one or more bits in the modulated reference signal 215.

In some examples, the UE 115 may obtain a back off value based on achieving AGC convergence and may use the back off value, along with the constellation indicated by the modulated reference signal 215, to set the resolution for the ADC. For example, the UE 115-*a* may use the constellation indicated by the modulated reference signal to select or otherwise determine a quantization floor for signal processing, and the UE 115-*a* may use knowledge of the received signal power of the modulated reference signal 215 and the quantization floor to determine the number of bits for the ADC resolution. For instance, if the UE 115-*a* receives an indication (either explicitly or implicitly) for a quadrature phase shift keying (QPSK) from the modulated reference signal 215 the UE 115-*a* may determine that an SNR is below a known value, such as below 20 dB. As such, the UE 115-*a* may select a quantization floor of 20 dB and determine to use approximately 3.5 bits of ADC resolution to maintain the SNR and an additional one or more bits to account for fading and back off. The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In some aspects, if the back off is relatively small (as may occur based on AGC convergence), the UE 115-*a* may be able to select to use fewer bits for the ADC, which may improve power savings at the UE 115-*a*. Further, setting a correct or suitable gain (at the AGC) may decrease the back off (which may be used to avoid clipping distortion) and, as such, the UE 115-*a* may linearly decrease the quantization noise (which the UE 115-*a* may measure or determine based on the energy of the modulated reference signal 215 and the amount of bits to use for the ADC). Accordingly, if the UE 115-*a* receives the modulated reference signal 215 with a relatively stronger signal strength (more gain), the UE 115-*a* may use less bits for opening the ADC.

In some aspects, such as in aspects in which the modulated reference signal 215 includes some information that may otherwise be transmitted via the PDCCH in DCI (such as the PDSCH constellation or the MCS), the BS 105-*a* may transmit a (dedicated) DCI format to convey information that complements the information indicated by the modulated reference signal 215. Further, in some examples, the UE 115-*a* may transmit one or more thresholds associated with the PDSCH constellation, the MCS, or the ADC of the UE 115-*a* to the BS 105-*a* via one or more RRC messages (as part of an RRC connection procedure) and the BS 105-*a* may include various information (such as the PDSCH constellation or the MCS) based on the one or more thresholds provided from the UE 115-*a*.

Figure 3:
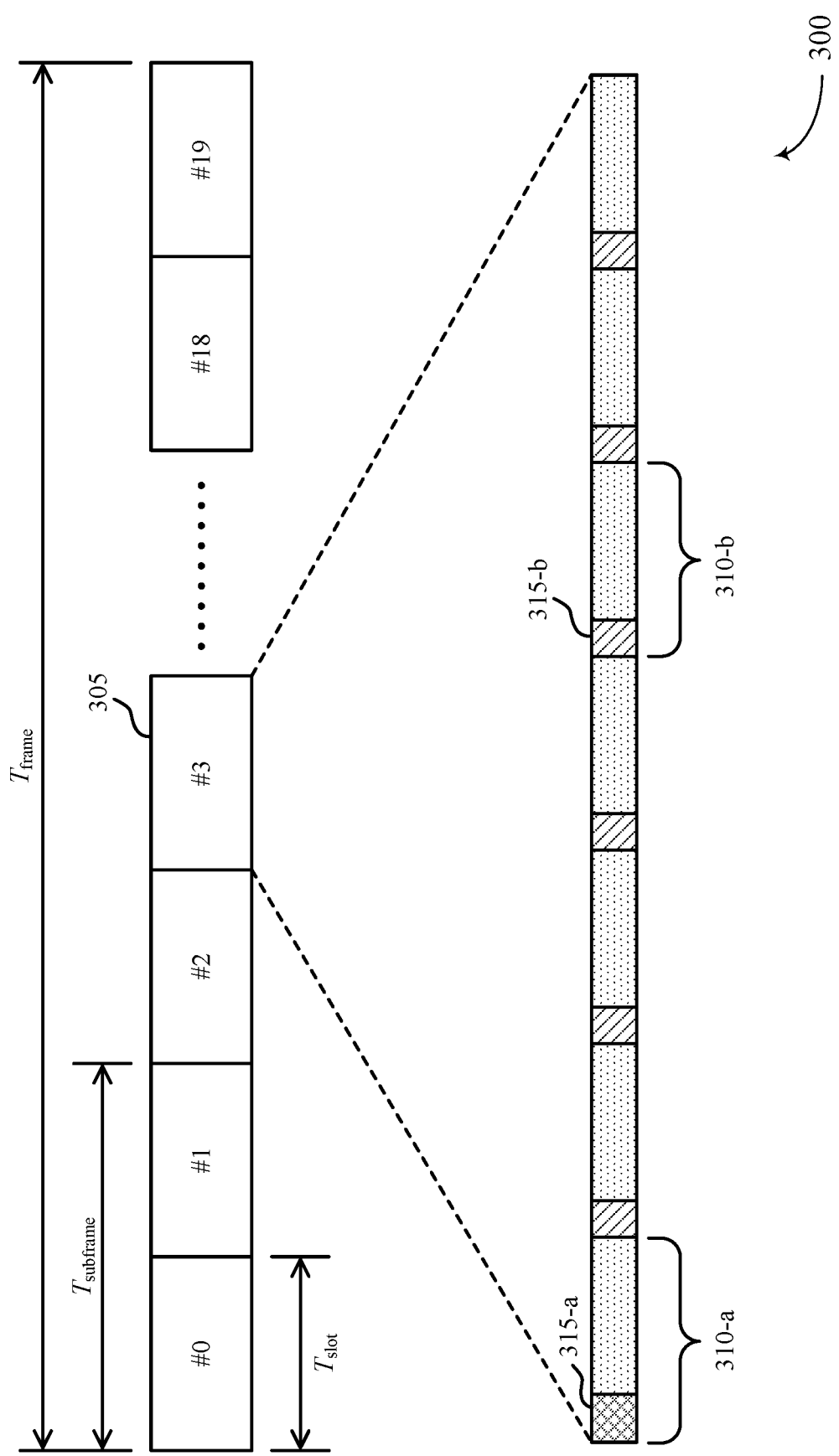
FIG. 3 illustrates an example of a slot format that supports techniques for setting a quantity of bits for an adaptive low-resolution ADC in higher band operation.

FIG. 3 illustrates an example of a slot configuration 300 that supports techniques for setting a quantity of bits for an adaptive low-resolution ADC in higher band operation. The slot configuration 300 may be implemented to realize aspects of the wireless communications system 100 or the signaling diagram 200. For example, a UE 115 and a BS 105 (which may be examples of corresponding devices described herein, including with reference to FIGS. 1 and 2) may communicate with each other according to a timing that is based on the slot configuration 300. In some examples, the BS 105 may transmit a modulated reference signal to the UE 115 in a portion of a CP 315-*a* of a first (for example, initial) symbol period 310-*a* of a slot 305 and the UE 115 may use the modulated reference signal to set a resolution for an ADC of the UE 115.

In some aspects, a frame (having a time duration $T_{frame}=307200 \times T_s=10$ ms, in which $T_s$ may refer to a sampling time) may include a number of slots 305 (such as 20 slots 305), a subframe (having a time duration $T_{subframe}=1$ ms) may include 2 slots 305 (having a time duration $T_{slot}=0.5$ ms), and a slot 305 may include a number of symbol periods 310 (which may be examples of OFDM symbol periods). For example, and as shown by the slot configuration 300, a slot 305 may include 7 symbol periods 310 and 7 CPs 315. However, a slot 305 may include any number of symbol periods 310, such as 14 symbol periods 310 and 14 CPs 315, without exceeding the scope of the present disclosure.

Each symbol period 310 may include a CP 315 at a beginning or start of that symbol period 310. In some examples, some symbol periods 310 may be longer (in time duration measured from the start of the symbol period 310 to the end of the symbol period 310) than other symbol periods 310, and such relatively longer symbol periods 310 may include CPs 315 that are longer (in time duration) than CPs of relatively shorter symbol periods 310. In some aspects, such relatively longer CPs 315 may be referred to as extended CPs 315 and such relatively shorter CPs 315 may be referred to as normal CPs 315. Further, in some examples, a time duration of a symbol period 310 and a CP 315 of a symbol period 310 may vary based on a numerology or subcarrier spacing (SCS). In some aspects, the slot configuration 300 may illustrate an example in which the UE 115 and the BS 105 employ a 15 kHz SCS.

In such aspects, a slot 305 may include 7 symbol periods 310 and the first (initial) symbol period 310-*a* may be longer than a remainder of the symbol periods 310 of the slot (or longer than at least the next six symbol periods 310). In some examples, for instance, the first symbol period 310-*a* may span a time duration of approximately 71.9 microseconds (or 2208 samples) while a symbol period 310-*b* may span a time duration of approximately 71.3 microseconds (or 2192 samples). Accordingly, the CP 315-*a* of the first symbol period 310-*a* may span a longer time duration than a CP 315-*b* of the symbol period 310-*b*. For example, the CP 315-*a* may span approximately 5.2 microseconds (or 160 samples) while the CP 315-*b* may span approximately 4.7 microseconds (or 144 samples). A useful symbol length may refer to a time duration of a symbol period 310 excluding a CP 315, such that a useful symbol length of the symbol period 310-*b* may span approximately 66.7 microseconds (or 2048 samples).

As described herein, the durations of the symbol periods 310 and the CPs 315 of the slot 305 may change based on a numerology or an SCS. As such, longer symbol periods 310 and extended CPs 315 may span shorter durations in time at higher SCSs, but may still be relatively longer in time than other symbol periods 310 and normal CPs 315. Further, as SCS increases, longer symbol periods 310 and extended CPs 315 may occur less frequently. For example, at 15 kHz a longer symbol period 310 and an extended CP 315 may occur in the first symbol period 310 (such as a symbol period 0) and in the eighth symbol period 310 (such as a symbol period 7) in each slot 305, while at 30 kHz a longer symbol period 310 and an extended CP 315 may occur in the first symbol period 310 of every slot 305. For further example, at 60 kHz a longer symbol period 310 and an extended CP 315 may occur in the first symbol period 310 of every second slot 305, at 120 kHz a longer symbol period 310 and an extended CP 315 may occur in the first symbol period 310 of every fourth slot 305, and at 240 kHz a longer symbol period 310 and an extended CP 315 may occur in the first symbol period 310 of every eighth slot 305.

In some implementations, the BS 105 may transmit the modulated reference signal that the UE 115 may use to set the ADC resolution during such longer symbol periods 310 (such as during the extended CPs 315 of such longer symbol periods 310) and, in some examples, may configure a periodicity of the modulated reference signal based on the numerology of the SCS. For example, the BS 105 may transmit the modulated reference signal at most every slot 305 in examples in which the SCS is 30 kHz and may transmit the modulated reference signal at most every second slot 305 in examples in which the SCS is 60 kHz. In some examples, the BS 105 may transmit a configuration of the modulated reference signal to the UE 115 to indicate or otherwise convey over which resources the UE 115 may receive the modulated reference signal (such as over which time and frequency resources of a longer symbol period 310) or how the UE 115 may receive the modulated reference signal (such as based on identifying an RNTI in the modulated reference signal). Additional details relating to how the BS 105 may configure the resources over which the modulated reference signal are described herein, including with reference to FIG. 4.

Figure 4:
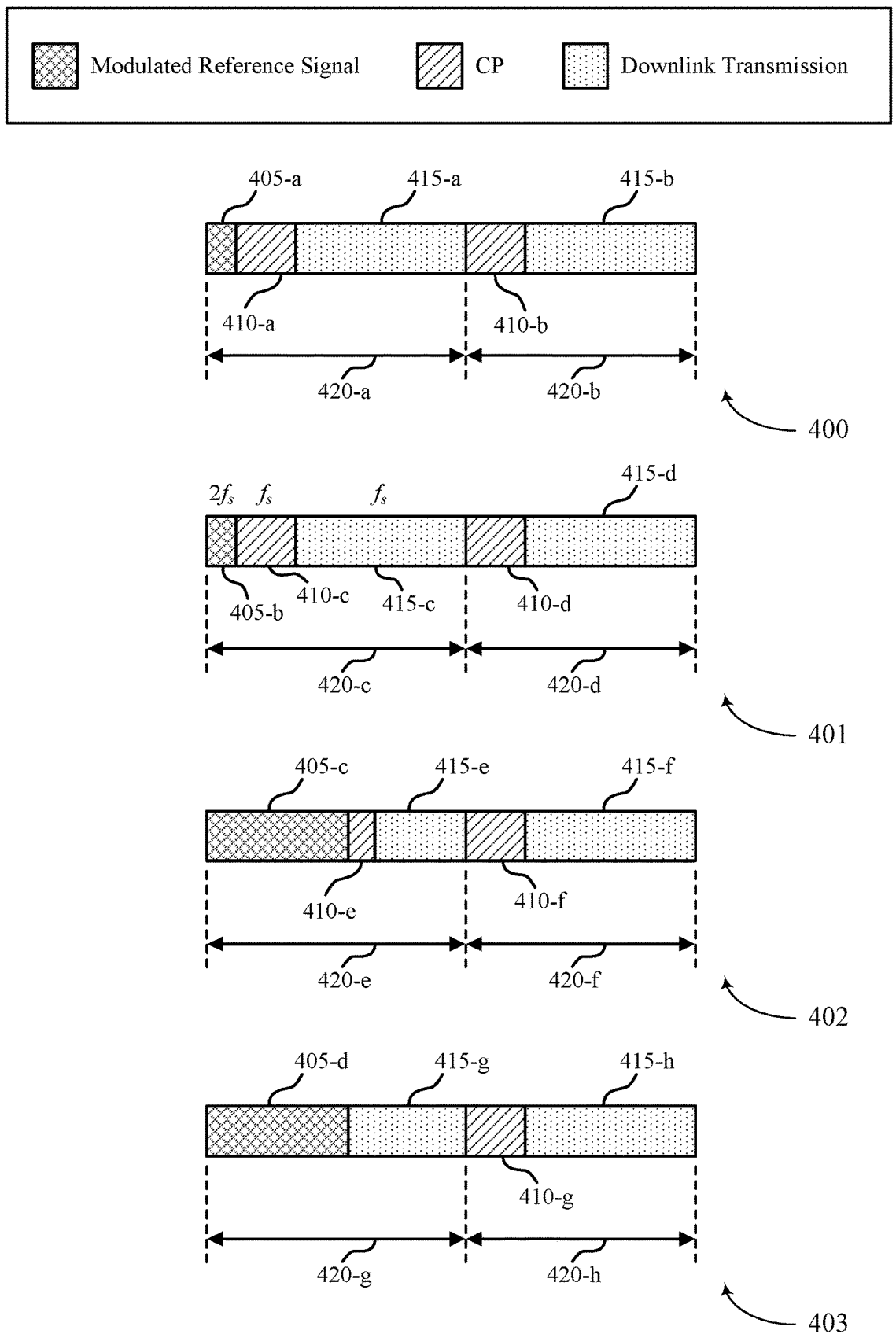
FIG. 4 illustrates examples of resource configurations that support techniques for setting a quantity of bits for an adaptive low-resolution ADC in higher band operation.

FIG. 4 illustrates examples of resource configurations 400, 401, 402, and 403 that support techniques for setting a quantity of bits for an adaptive low-resolution ADC in higher band operation. The resource configurations 400, 401, 402, and 403 may implement or be implemented to realize aspects of the wireless communications system 100 or the signaling diagram 200. For example, the resource configurations 400, 401, 402, and 403 may illustrate various configurations of the resources over which a BS 105 may transmit a modulated reference signal 405 to a UE 115 for use in setting a resolution of an ADC of the UE 115, and such a BS 105 and a UE 115 may be examples of corresponding devices described herein, including with reference to FIGS. 1 and 2. In some examples, the BS 105 may transmit configuration signaling indicating one or more of the resource configurations 400, 401, 402, or 403 via RRC signaling during a connection establishment procedure.

In some implementations, the BS 105 may configure the resources over which the BS 105 may transmit the modulated reference signal 405 to the UE 115 according to the resource configuration 400. In such implementations, the BS 105 may transmit a modulated reference signal 405-a to the UE 115 during a symbol period 420-a of a slot that is relatively longer in time duration than other symbol periods 420 of the slot (such as a symbol period 420-b). In some aspects, such a relatively longer symbol period 420-a may be a first (initial) symbol period 420 of the slot. As described in more detail with reference to FIG. 3, a time duration of a symbol period 420 and a CP 410 of the symbol period 420 may change based on a numerology or an SCS. In examples in which the UE 115 and the BS 105 communicate using a 15 kHz SCS, however, the CP 410-a of the symbol period 420-a ay be 0.5 microseconds longer than a CP 410-b of the relatively shorter symbol period 420-b.

As such, the BS 105 may transmit the modulated reference signal 405-a (which may include or be an example of a data preamble) over the additional samples associated with the extra time duration of the CP 410-a. In some aspects, a number of samples captured in the extra time duration of the CP 410-a (such as the extra 0.5 microseconds) may depend linearly on a used bandwidth (a bandwidth used for transmitting or receiving between the UE 115 and the BS 105 or a bandwidth set for the ADC of the UE 115). For example, 0.5 microseconds may capture or include 16 samples for a 20 MHz bandwidth. For a higher SCS (an SCS higher than 15 kHz) the extra 0.5 microsecond occasions may be smaller, but based on a likely increase in bandwidth at such higher SCSs the number of samples may remain similar.

As such, the BS 105 may transmit the modulated reference signal 405-a over a subset of time domain resources of the CP 410-a in the symbol period 420-a. The UE 115 may set the resolution of the ADC of the UE 115 based on receiving the modulated reference signal 405-a and may receive a downlink transmission 415-a and a downlink transmission 415-b based on the modulated reference signal 405-a and the setting of the ADC resolution. In some aspects, the downlink transmission 415-a and the downlink transmission 415-b may be examples of a same downlink transmission 415. Alternatively, the downlink transmission 415-a and the downlink transmission 415-b may be examples of a PDCCH transmission and a PDSCH transmission, respectively.

In some other implementations, the BS 105 may configure the resources over which the BS 105 may transmit the modulated reference signal 405 to the UE 115 according to the resource configuration 401. In such implementations, the BS 105 may similarly transmit a modulated reference signal 405-b to the UE 115 during a symbol period 420-c that is relatively longer in time duration than other symbol periods 420 of the slot (such as a symbol period 420-d). In examples in which the BS 105 transmits the modulated reference signal 405-b according to the resource configuration 401, however, the BS 105 may transmit the modulated reference signal 405-b out-of-band of downlink transmissions 415 of the slot based on using a larger bandwidth than that of the downlink transmissions 415 (the data). For example, the BS 105-a may burst a transmitter and transmit the modulated reference signal 405-b at twice the bandwidth (which may be referred to as $2f_s$) relative to the bandwidth of a CP 410-c, a downlink transmission 415-c, a CP 410-d, and a downlink transmission 415-d (which may be referred to as $f_s$). As such, the UE 115 may set a relatively higher resolution for the ADC of the UE 115 while receiving the modulated reference signal 405-b, which may result in more samples and a greater probability of detection for the modulated reference signal 405-b. The UE 115, based on the greater probability of detection, may experience a greater processing gain.

In some aspects, the UE 115 may refrain from estimating interference associated with one or more blockers (interference caused by other transmissions) if the modulated reference signal 405-b is configured according to the resource configuration 401. Instead, the UE 115 may perform such blockers estimation on a PDCCH transmission (such as the downlink transmission 415-c). In some implementations, and based on transmitting the modulated reference signal 405-b at the beginning of the CP 410-c of the symbol period 420-c, the modulated reference signal 405-b may avoid causing interference for other transmissions because potential victim transmissions also may be sent from the BS 105 (such that the BS 105 may employ techniques for avoiding cross-link interference) or because the modulated reference signal 405-b may not show in a delay spread. In some examples, the BS 105 may use the extra bandwidth of the modulated reference signal 405-*b* to increase a number of sequences of the modulated reference signal 405-*b* to supply information to more UEs 115.

In some other implementations, the BS 105 may configure the resources over which the BS 105 may transmit the modulated reference signal 405 to the UE 115 according to the resource configuration 402. In such implementations, the BS 105 may achieve a greater number of samples in a modulated reference signal 405*c* based on splitting a first (initial) symbol period 420-*e* into two symbols, transmitting the modulated reference signal 405-*c* in a first of the two relatively smaller symbols, and transmitting a downlink transmission 415-*e* (which may include a PDCCH transmission and, in some examples, a PDSCH transmission) in a second of the two relatively smaller symbols. For example, the configuration of the modulated reference signal 405-*c* that the BS 105 sends to the UE 115 may include a symbol configuration splitting the symbol period 420-*a* into two separate symbols, such as a first symbol and a second symbol. In some aspects, the symbol configuration splitting the symbol period 420-*a* may indicate (either explicitly or implicitly) that the two separate symbols have a greater SCS than an SCS originally configured for the symbol period 420-*e*. For example, the symbol configuration may increase a first SCS of the two separate symbols by a product of two relative to a second SCS of the symbol period 420-*e*. In other words, the symbol configuration may split the symbol period 420-*e* into two separate symbols and increase the first SCS of the two separate symbols to be twice the second SCS that is originally configured for the symbol period 420-*e*.

As such, the BS 105 may transmit the modulated reference signal 405-*c* over a greater number of samples (as compared to an amount of samples over which the BS 105 may transmit the modulated reference signal 405-*c* according to other resource configurations). In some examples, the BS 105 may use the greater number of samples of the modulated reference signal 405-*c* to include some portion (such as some number of bits) of a PDCCH in the modulated reference signal 405-*c*. Additionally, or alternatively, the BS 105 may use the greater number of samples to transmit the modulated reference signal 405-*c* to multiple UEs 115.

For example, the BS 105 may convey a greater number of bits via the modulated reference signal 405-*c* based on the greater number of samples and the BS 105 may use a portion of the bits to indicate one or more RNTIs. As such, the BS 105 may address the modulated reference signal 405-*c* to one or more UEs 115 (based on the indicated one or more RNTIs) to indicate with how many bits those one or more UEs 115 may open an ADC. In other words, the BS 105 may use the modulated reference signal 405-*c* to indicate an ADC resolution for multiple UEs 115. In some examples, for instance, the modulated reference signal 405*c* may include approximately or greater than 500 samples or sequences and, as such, the modulated reference signal 405*c* may convey approximately 9 bits of information. Accordingly, in some implementations, the BS 105 may use a first portion of the bits (such as 6 or 7 bits) to convey one or more RNTIs (in full or in part) and may use a second portion of the bits (such as 2 or 3 bits) to convey other information (such as a PDSCH constellation, an MCS, or a number of bits to use to open an ADC). As such, a UE 115 associated with an RNTI included in the modulated reference signal 405*c* may receive and demodulate at least a portion of the modulated reference signal 405*c* including the RNTI associated with that UE 115.

Although such an approach for splitting the symbol period 420-*e* into two separate symbols may result in an added symbol period 420 of overhead, power savings associated with the setting of a reference signal-based ADC resolution at multiple UEs 115 may outweigh any resulting increase in overhead. In some aspects, the first symbol of the two separate symbols split from the symbol period 420-*e* may not include a CP 410, while the second symbol of the two separate symbols may include a CP 410-*e* and the downlink transmission 415-*e*. Other symbol periods 420 and CPs 410 of the slot, such as the symbol period 420-*f* including a downlink transmission 415-*f* and a CP 410-*f* of the symbol period 420-*f*, may be unaffected by the symbol configuration splitting the symbol period 420-*e*.

In some examples, a UE 115 may receive the modulated reference signal 405*c* if the UE 115 is capable of the numerology or SCS associated with the two separate symbols split from the symbol period 420-*e*. In other words, UEs 115 that have the capability to support the numerology or SCS associated with the two separate symbols split from the symbol period 420-*e* may be configured according to the resource configuration 403 while UEs 115 that are incapable of supporting such numerology or SCS may not be configured according to the resource configuration 403. In some aspects, the information carried via the modulated reference signal 405*c* may be frequency division multiplexed or time division multiplexed. In examples in which the information carried via the modulated reference signal 405*c* is time division multiplexed, different UEs 115 may receive different portions of the modulated reference signal 405*c* at different times.

In some other implementations, the BS 105 may configure the resources over which the BS 105 may transmit the modulated reference signal 405 to the UE 115 according to the resource configuration 403. In such implementations, the BS 105 may transmit a modulated reference signal 405-*d* over a single carrier for a first (initial) symbol period 420-*g*. As such, initial data conveyed over the symbol period 420-*g* may include the modulated reference signal 405-*d* and a remainder of the data conveyed over the symbol period 420-*g* may include a downlink transmission 415-*g* (such as a PDCCH transmission). As such, the symbol period 420-*g* may not include a CP 410 and, in some examples, may be absent of OFDM. Further, although the BS 105 or the UE 115 may equalize the single carrier or single channel, the PDCCH transmission carried over the symbol period 420-*g* may be associated with a relatively low rate such that the UE 115 may successfully decode the PDCCH using a relatively basic or simple equalization, even in a presence of inter-symbol interference (ISI). The resource configuration 403, configuring the transmission of the modulated reference signal 405-*d* over the single carrier during the symbol period 420-*g*, may avoid adjusting carrier information associated with other symbol periods 420 of the slot, such as a symbol period 420-*h* including a CP 410-*g* and a downlink transmission 415-*h* (such that the BS 105 may transmit over the single carrier exclusively for the symbol period 420-*g*).

Figure 5:
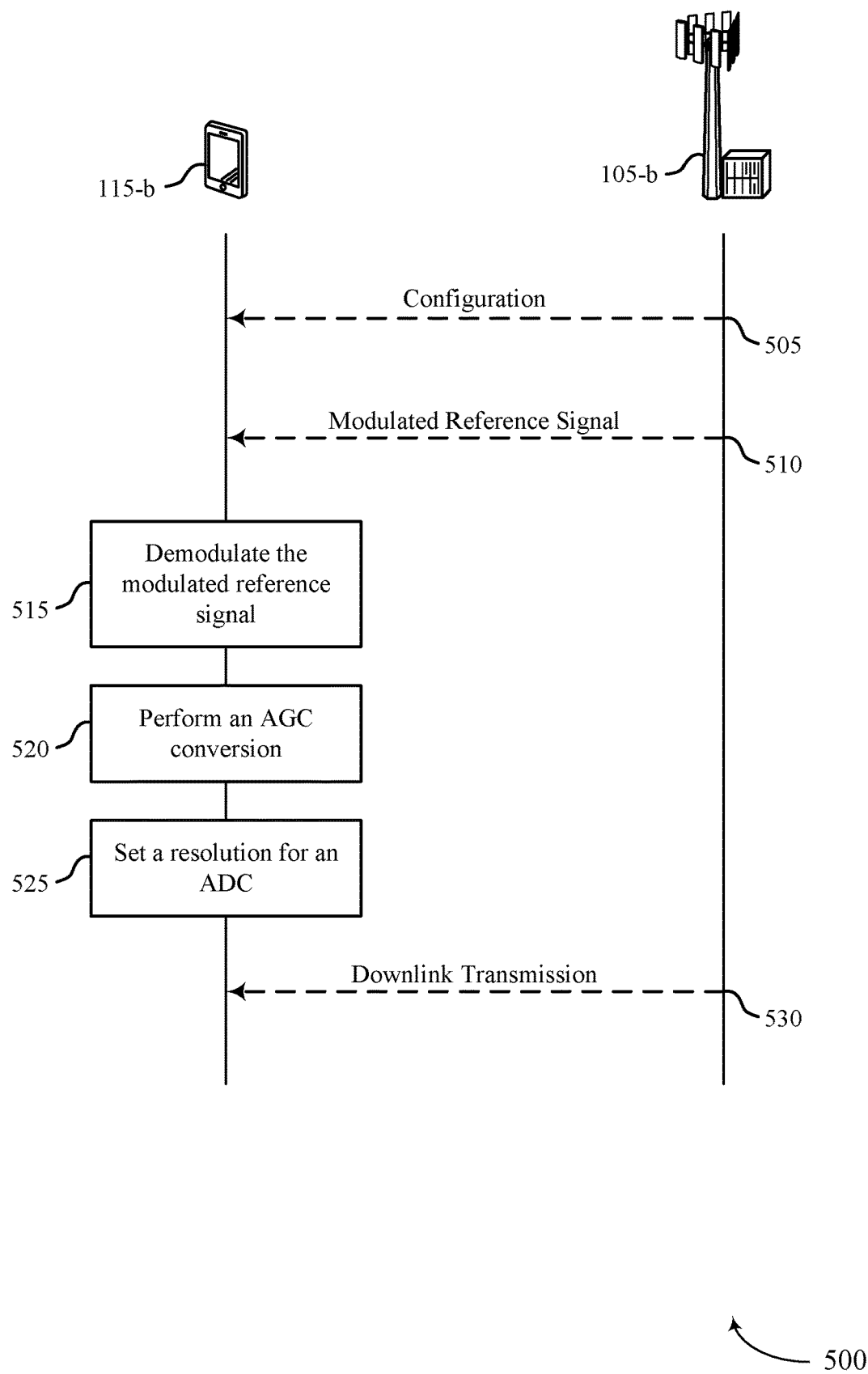
FIG. 5 illustrates an example of a process flow that supports techniques for setting a quantity of bits for an adaptive low-resolution ADC in higher band operation.

FIG. 5 illustrates an example of a process flow 500 that supports techniques for setting a quantity of bits for an adaptive low-resolution ADC in higher band operation. The process flow 500 may implement or be implemented to realize aspects of the wireless communications system 100 or the signaling diagram 200. For example, the process flow 500 may illustrate communication between a UE 115-*b* and a BS 105-*b*, which may be examples of corresponding devices described herein, including with reference to FIGS. 1 and 2. In some examples, the UE 115-*b* may receive a modulated reference signal in a first or initial portion of a first or initial symbol period of a slot and may use the modulated reference signal to set a resolution of an ADC at the UE 115-*b*.

In the following description of the process flow 500, the operations may be performed (for example, reported or provided) in a different order than the order shown. Specific operations also may be left out of the process flow 500, or other operations may be added to the process flow 500. Further, although some operations or signaling may be shown to occur at different times for discussion purposes, these operations may actually occur at the same time.

At 505, the UE 115-*b* may receive, from the BS 105-*b*, a configuration of a modulated reference signal for a first (initial) OFDM symbol of a slot. In some examples, the configuration may indicate or configure a resource allocation or a resource configuration that the UE 115-*b* may use for receiving the modulated reference signal, as described in more detail herein, including with reference to FIG. 4. Additionally, or alternatively, the configuration of the modulated reference signal may include an indication of a periodicity of the modulated reference signal (such as twice per slot, once per slot, every other slot, and so on).

At 510, the UE 115-*b* may receive, from the BS 105-*b*, the modulated reference signal in the first OFDM symbol of the slot based on the configuration. In some examples, for instance, the UE 115-*b* may receive the modulated reference signal over a time and frequency resource allocation for the modulated reference signal as configured or allocated by the configuration received at 510. In some examples, the UE 115-*b* may receive an RNTI associated with the UE 115-*b* in at least a portion of the modulated reference signal that is dedicated for the UE 115-*b* (as may occur in examples in which the BS 105-*b* transmits the modulated reference signal to multiple UEs 115). In some aspects, the modulated reference signal may include or be an example of a time domain sequence, the time domain sequence including at least one of a Zadoff-Chu sequence, a Gold sequence, or a Walsh Code, among other examples. In some examples, the modulated reference signal may indicate (either implicitly or explicitly) an MCS, a constellation of a downlink transmission (such as a PDSCH constellation), a quantity of bits associated with a resolution of an ADC of the UE 115-*b*, or a combination thereof.

At 515, the UE 115-*b* may demodulate the modulated reference signal according to one or more hypotheses (such as one or more correlator hypotheses). In some examples, the UE 115-*b* may select a strongest peak correlation based on demodulating the modulated reference signal and, in some implementations, the UE 115-*b* may use the peak correlation to assist with some PDCCH or PDSCH detectors such as STO or CFO estimation. In some aspects, the UE 115-*b* may have some probability for successfully demodulating the modulated reference signal, as described in more detail herein, including with reference to FIG. 2.

At 520, the UE 115-*b* may perform an AGC conversion based on demodulating the modulated reference signal. In some examples, for instance, the UE 115-*b* may calibrate a first gain at an AGC of the UE 115-*b* based on sampling the modulated reference signal according to a first sampling rate (a relatively larger sampling rate), measure a first energy of the modulated reference signal based on the first sampling rate, calibrate a second gain at the AGC (for example, the UE 115-*b* may re-calibrate the AGC) based on sampling the modulated reference signal according to a second sampling rate lower than the first sampling (such as an OFDM or occupied bandwidth sampling rate), and measure a second energy of the modulated reference signal based on the second sampling rate. In some implementations, the UE 115-*b* may estimate an interference (for example, estimate blockers) at the UE 115-*b* from one or more other UEs (or any other transmissions) based on an energy gap or a ratio between the first energy and the second energy.

At 525, the UE 115-*b* may set a resolution for the ADC of the UE 115-*b* based on the demodulating of the modulated reference signal. For example, based on receiving the modulated reference signal, the UE 115-*b* may select or otherwise determine a resolution or a number of bits to use for opening the ADC of the UE 115-*b*.

At 530, the UE 115-*b* may receive, from the BS 105-*b*, a downlink transmission (such as a PDSCH transmission) based on demodulating the modulated reference signal. For example, the UE 115-*b* may receive and process the downlink transmission from the BS 105-*b* using the ADC resolution set based on the modulated reference signal. As such, the UE 115-*b* may set and implement an appropriate or suitable ADC resolution with lower latency as compared to other some other approaches, such as a DCI-based approach.

Figure 6:
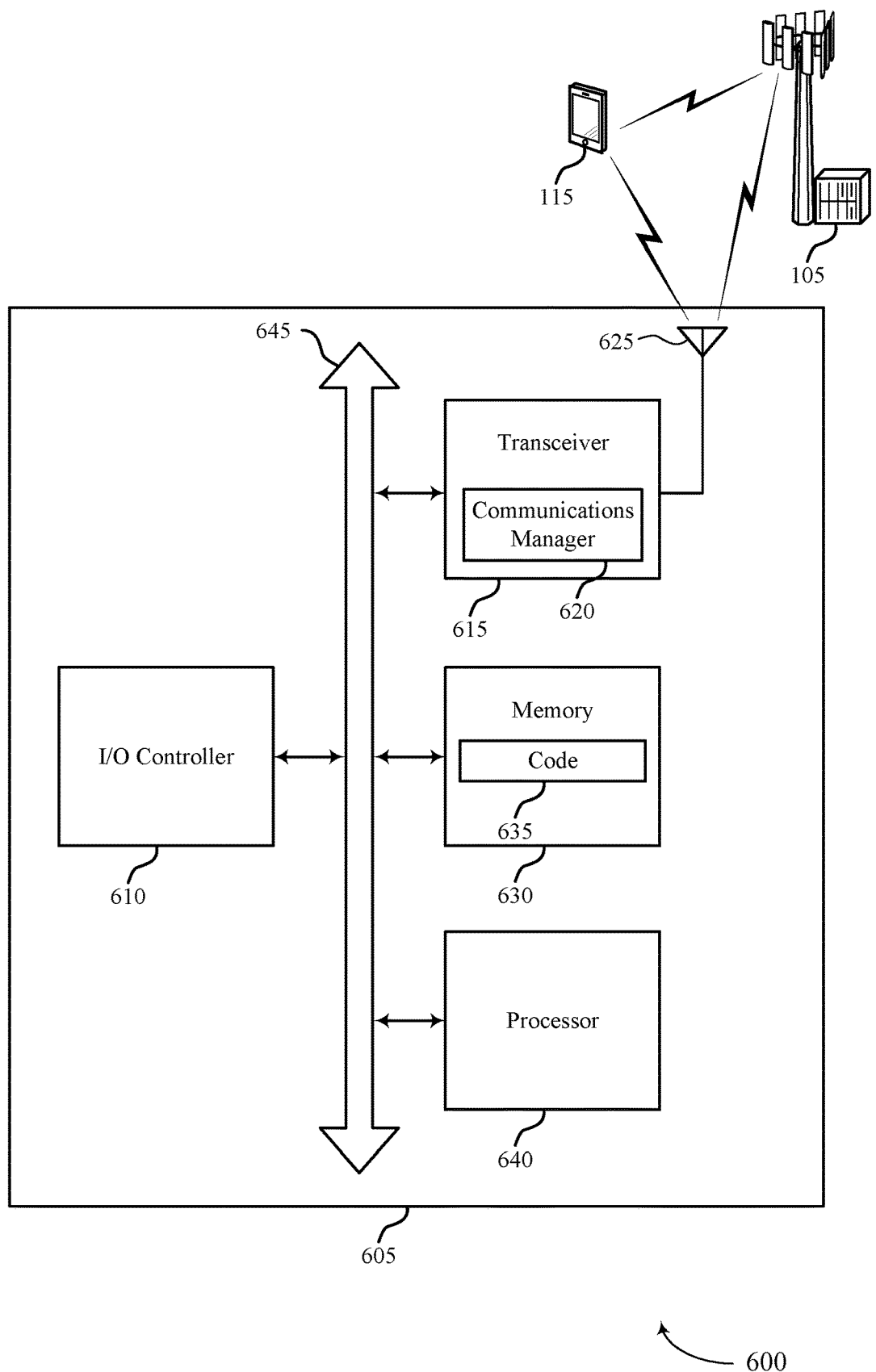
FIGS. 6 and 7 show block diagrams of example devices that support techniques for setting a quantity of bits for an adaptive low-resolution ADC in higher band operation.

FIG. 6 shows a block diagram 600 of an example device 605 that supports techniques for setting a quantity of bits for an adaptive low-resolution ADC in higher band operation. The device 605 may communicate wirelessly with one or more BSs 105, UEs 115, or any combination thereof. The device 605 may include components for bi-directional voice and data communications including components for transmitting and receiving communications, such as a communications manager 620, an input/output (I/O) controller 610, a transceiver 615, an antenna 625, a memory 630, code 635, and a processor 640. These components may be in electronic communication or otherwise coupled (for example, operatively, communicatively, functionally, electronically, electrically) via one or more buses (for example, a bus 645).

The I/O controller 610 may manage input and output signals for the device 605. The I/O controller 610 also may manage peripherals not integrated into the device 605. In some implementations, the I/O controller 610 may represent a physical connection or port to an external peripheral. In some implementations, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some implementations, the I/O controller 610 may be implemented as part of a processor, such as the processor 640. In some implementations, a user may interact with the device 605 via the I/O controller 610 or via hardware components controlled by the I/O controller 610.

In some implementations, the device 605 may include a single antenna 625. However, in some other cases, the device 605 may have more than one antenna 625, which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 also may include a modem to modulate the packets, to provide the modulated packets to one or more antennas 625 for transmission, and to demodulate packets received from the one or more antennas 625.

The memory 630 may include random access memory (RAM) and read-only memory (ROM). The memory 630 may store computer-readable, computer-executable code 635 including instructions that, when executed by the processor 640, cause the device 605 to perform various functions described herein. The code 635 may be stored in a non-transitory computer-readable medium such as system memory or another type of memory. In some implementations, the code 635 may not be directly executable by the processor 640 but may cause a computer (for example, when compiled and executed) to perform functions described herein. In some implementations, the memory 630 may contain, among other things, a basic I/O system (BIOS) which may control basic hardware or software operation such as the interaction with peripheral components or devices.

The processor 640 may be any one or more suitable processors capable of executing scripts or instructions of one or more software programs stored in the device 605 (such as within the memory 630). In some implementations, the processor 640 may be a component of a processing system. A processing system may generally refer to a system or series of machines or components that receives inputs and processes the inputs to produce a set of outputs (which may be passed to other systems or components of, for example, the device 605). For example, a processing system of the device 605 may refer to a system including the various other components or subcomponents of the device 605.

The processing system of the device 605 may interface with other components of the device 605, and may process information received from other components (such as inputs or signals) or output information to other components. For example, a chip or modem of the device 605 may include a processing system, a first interface to output information, and a second interface to obtain information. In some implementations, the first interface may refer to an interface between the processing system of the chip or modem and a transmitter, such that the device 605 may transmit information output from the chip or modem. In some implementations, the second interface may refer to an interface between the processing system of the chip or modem and a receiver, such that the device 605 may obtain information or signal inputs, and the information may be passed to the processing system. A person having ordinary skill in the art will readily recognize that the first interface also may obtain information or signal inputs, and the second interface also may output information or signal outputs.

The communications manager 620 may support wireless communication at a UE in accordance with examples as disclosed herein. For example, the communications manager 620 may be configured as or otherwise support a means for receiving, from a BS, a configuration of a modulated reference signal for a first OFDM symbol of a slot. In some examples, the communications manager 620 may be configured as or otherwise support a means for receiving, from the BS, the modulated reference signal in the first OFDM symbol of the slot based on the configuration. In some examples, the communications manager 620 may be configured as or otherwise support a means for demodulating the modulated reference signal according to one or more hypotheses. In some examples, the communications manager 620 may be configured as or otherwise support a means for receiving, from the BS, a downlink transmission in the slot based on demodulating the modulated reference signal.

In some examples, to support receiving the configuration of the modulated reference signal, the communications manager 620 may be configured as or otherwise support a means for receiving an allocation of a first portion of a first cyclic prefix (CP) of the first OFDM symbol for the modulated reference signal in a time domain and a first frequency band equal to a second frequency band of the downlink transmission for the modulated reference signal in a frequency domain, where receiving the modulated reference signal is based on the allocation.

In some examples, to support receiving the configuration of the modulated reference signal, the communications manager 620 may be configured as or otherwise support a means for receiving an allocation of a first portion of a first cyclic prefix (CP) of the first OFDM symbol for the modulated reference signal in a time domain and a first frequency band greater than a second frequency band of the downlink transmission for the modulated reference signal in a frequency domain, where receiving the modulated reference signal is based on the allocation.

In some examples, to support receiving the configuration of the modulated reference signal, the communications manager 620 may be configured as or otherwise support a means for receiving a symbol configuration splitting the first OFDM symbol into a second OFDM symbol and a third OFDM symbol and increasing a first SCS of the second OFDM symbol and the third OFDM symbol by a product of two relative to a second SCS of the first OFDM symbol. In some examples, to support receiving the modulated reference signal, the communications manager 620 may be configured as or otherwise support a means for receiving the modulated reference signal in the second OFDM symbol based on the symbol configuration.

In some examples, the communications manager 620 may be configured as or otherwise support a means for receiving the modulated reference signal includes receiving an RNTI of the UE in at least a portion of the modulated reference signal. In some examples, the communications manager 620 may be configured as or otherwise support a means for demodulating the modulated reference signal includes demodulating at least the portion of the modulated reference signal.

In some examples, to support receiving the configuration of the modulated reference signal, the communications manager 620 may be configured as or otherwise support a means for receiving an allocation of a single carrier for the first OFDM symbol, where receiving the modulated reference signal is based on the allocation.

In some examples, to support receiving the configuration of the modulated reference signal, the communications manager 620 may be configured as or otherwise support a means for receiving an indication of a periodicity of the modulated reference signal, where receiving the modulated reference signal is based on the periodicity of the modulated reference signal. In some examples, the communications manager 620 may be configured as or otherwise support a means for performing an AGC conversion based on demodulating the modulated reference signal, where receiving the downlink transmission in the slot is based on performing the AGC conversion.

In some examples, the communications manager 620 may be configured as or otherwise support a means for calibrating a first gain at an AGC of the UE based on sampling the modulated reference signal according to a first sampling rate. In some examples, the communications manager 620 may be configured as or otherwise support a means for measuring a first energy of the modulated reference signal based on the first sampling rate. In some examples, the communications manager 620 may be configured as or otherwise support a means for calibrating a second gain at the AGC of the UE based on sampling the modulated reference signal according to a second sampling rate lower than the first sampling rate. In some examples, the communications manager 620 may be configured as or otherwise support a means for measuring a second energy of the modulated reference signal based on the second sampling rate. In some examples, the communications manager 620 may be configured as or otherwise support a means for estimating an interference at the UE from one or more other UEs based on the first energy and the second energy.

In some examples, the communications manager 620 may be configured as or otherwise support a means for measuring a first energy of at least a first portion of the modulated reference signal located in-band of a first frequency band of the downlink transmission. In some examples, the communications manager 620 may be configured as or otherwise support a means for measuring a second energy of at least a second portion of the modulated reference signal located out-of-band of the first frequency band of the downlink transmission. In some examples, the communications manager 620 may be configured as or otherwise support a means for estimating an interference at the UE from one or more other UEs based on the first energy and the second energy.

In some examples, the communications manager 620 may be configured as or otherwise support a means for setting a resolution for an ADC based on the demodulating, where receiving the downlink transmission in the slot is based on setting the resolution for the ADC.

In some examples, to support receiving the modulated reference signal, the communications manager 620 may be configured as or otherwise support a means for receiving an indication of an MCS of the downlink transmission in the slot, a constellation of the downlink transmission, a quantity of bits associated with a resolution for an ADC of the UE, or a combination thereof.

In some examples, the one or more hypotheses include one or more correlator hypotheses, and the communications manager 620 may be configured as or otherwise support a means for selecting a peak correlation based on demodulating the modulated reference signal according to the one or more correlator hypotheses. In some examples, the one or more hypotheses include one or more correlator hypotheses, and the communications manager 620 may be configured as or otherwise support a means for estimating a timing offset or a frequency offset based on selecting the peak correlation, where receiving the downlink transmission is based on the timing offset or the frequency offset.

In some examples, the demodulating of the modulated reference signal is based on a time domain sequence, the time domain sequence including at least one of a Zadoff-Chu sequence, a Gold sequence, or a Walsh Code.

In some examples, the communications manager 620 may be configured to perform various operations (for example, receiving, monitoring, transmitting) using or otherwise in cooperation with the transceiver 615, the one or more antennas 625, or any combination thereof. Although the communications manager 620 is illustrated as a separate component, in some examples, one or more functions described with reference to the communications manager 620 may be supported by or performed by the processor 640, the memory 630, the code 635, or any combination thereof. For example, the code 635 may include instructions executable by the processor 640 to cause the device 605 to perform various aspects of techniques for setting a quantity of bits for an adaptive low-resolution ADC in higher band operation as described herein, or the processor 640 and the memory 630 may be otherwise configured to perform or support such operations.

Figure 7:
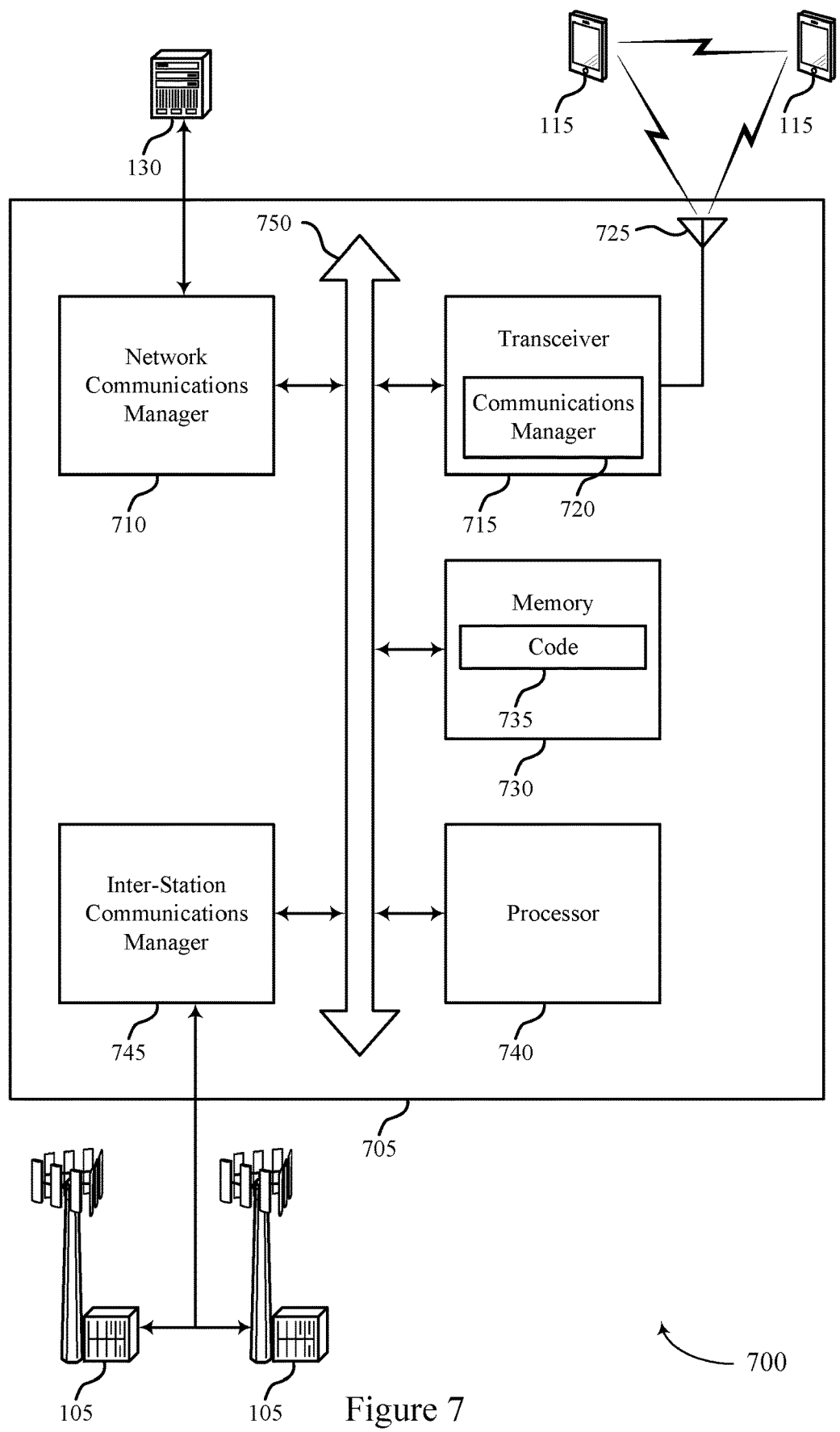

FIG. 7 shows a block diagram 700 of an example device 705 that supports techniques for setting a quantity of bits for an adaptive low-resolution ADC in higher band operation.

The device 705 may communicate wirelessly with one or more BSs 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (for example, operatively, communicatively, functionally, electronically, electrically) via one or more buses (for example, a bus 750).

The network communications manager 710 may manage communications with a core network 130 (for example, via one or more wired backhaul links). For example, the network communications manager 710 may manage the transfer of data communications for client devices, such as one or more UEs 115.

In some implementations, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 also may include a modem to modulate the packets, to provide the modulated packets to one or more antennas 725 for transmission, and to demodulate packets received from the one or more antennas 725.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some implementations, the code 735 may not be directly executable by the processor 740 but may cause a computer (for example, when compiled and executed) to perform functions described herein. In some implementations, the memory 730 may contain, among other things, a BIOS which may control basic hardware or software operation such as the interaction with peripheral components or devices.

The inter-station communications manager 745 may manage communications with other BSs 105, and may include a controller or scheduler for controlling communications with UEs 115 in cooperation with other BSs 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between BSs 105.

The processor 740 may be any one or more suitable processors capable of executing scripts or instructions of one or more software programs stored in the device 705 (such as within the memory 730). In some implementations, the processor 740 may be a component of a processing system. A processing system may generally refer to a system or series of machines or components that receives inputs and processes the inputs to produce a set of outputs (which may be passed to other systems or components of, for example, the device 705). For example, a processing system of the device 705 may refer to a system including the various other components or subcomponents of the device 705.

The processing system of the device 705 may interface with other components of the device 705, and may process information received from other components (such as inputs or signals) or output information to other components. For example, a chip or modem of the device 705 may include a processing system, a first interface to output information, and a second interface to obtain information. In some implementations, the first interface may refer to an interface between the processing system of the chip or modem and a transmitter, such that the device 705 may transmit information output from the chip or modem. In some implementations, the second interface may refer to an interface between the processing system of the chip or modem and a receiver, such that the device 705 may obtain information or signal inputs, and the information may be passed to the processing system. A person having ordinary skill in the art will readily recognize that the first interface also may obtain information or signal inputs, and the second interface also may output information or signal outputs.

The communications manager 720 may support wireless communication at a BS in accordance with examples as disclosed herein. For example, the communications manager 720 may be configured as or otherwise support a means for transmitting, to a UE, a configuration of a modulated reference signal for a first OFDM symbol of a slot. In some examples, the communications manager 720 may be configured as or otherwise support a means for transmitting, to the UE, the modulated reference signal in the first OFDM symbol of the slot based on the configuration. In some examples, the communications manager 720 may be configured as or otherwise support a means for transmitting, to the UE, a downlink transmission in the slot based on transmitting the modulated reference signal.

In some examples, to support transmitting the configuration of the modulated reference signal, the communications manager 720 may be configured as or otherwise support a means for transmitting an allocation of a first portion of a first CP of the first OFDM symbol for the modulated reference signal in a time domain and a first frequency band equal to a second frequency band of the downlink transmission for the modulated reference signal in a frequency domain, where transmitting the modulated reference signal is based on the allocation.

In some examples, to support transmitting the configuration of the modulated reference signal, the communications manager 720 may be configured as or otherwise support a means for transmitting an allocation of a first portion of a first CP of the first OFDM symbol for the modulated reference signal in a time domain and a first frequency band greater than a second frequency band of the downlink transmission for the modulated reference signal in a frequency domain, where transmitting the modulated reference signal is based on the allocation.

In some examples, to support transmitting the configuration of the modulated reference signal, the communications manager 720 may be configured as or otherwise support a means for transmitting a symbol configuration splitting the first OFDM symbol into a second OFDM symbol and a third OFDM symbol and increasing a first SCS of the second OFDM symbol and the third OFDM symbol by a product of two relative to a second SCS of the first OFDM symbol. In some examples, to support transmitting the modulated reference signal, the communications manager 720 may be configured as or otherwise support a means for transmitting the modulated reference signal in the second OFDM symbol based on the symbol configuration.

In some examples, to support transmitting the modulated reference signal, the communications manager 720 may be configured as or otherwise support a means for transmitting a first RNTI of the UE in at least a first portion of the modulated reference signal. In some examples, to support transmitting the modulated reference signal, the communications manager 720 may be configured as or otherwise support a means for transmitting a second RNTI of a second UE in at least a second portion of the modulated reference signal. In some examples, to support transmitting the configuration of the modulated reference signal, the communications manager 720 may be configured as or otherwise support a means for transmitting an allocation of a single carrier for the first OFDM symbol, where transmitting the modulated reference signal is based on the allocation.

In some examples, to support transmitting the configuration of the modulated reference signal, the communications manager 720 may be configured as or otherwise support a means for transmitting an indication of a periodicity of the modulated reference signal, where transmitting the modulated reference signal is based on the periodicity of the modulated reference signal.

In some examples, to support transmitting the modulated reference signal, the communications manager 720 may be configured as or otherwise support a means for transmitting an indication of an MCS of the downlink transmission in the slot, a constellation of the downlink transmission, a quantity of bits associated with a resolution for an ADC of the UE, or a combination thereof. In some examples, the modulated reference signal includes a time domain sequence including at least one of a Zadoff-Chu sequence, a Gold sequence, or a Walsh Code, among other examples.

In some examples, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for setting a quantity of bits for an adaptive low-resolution ADC in higher band operation as described herein, or the processor 740 and the memory 730 may be otherwise configured to perform or support such operations.

Figure 8:
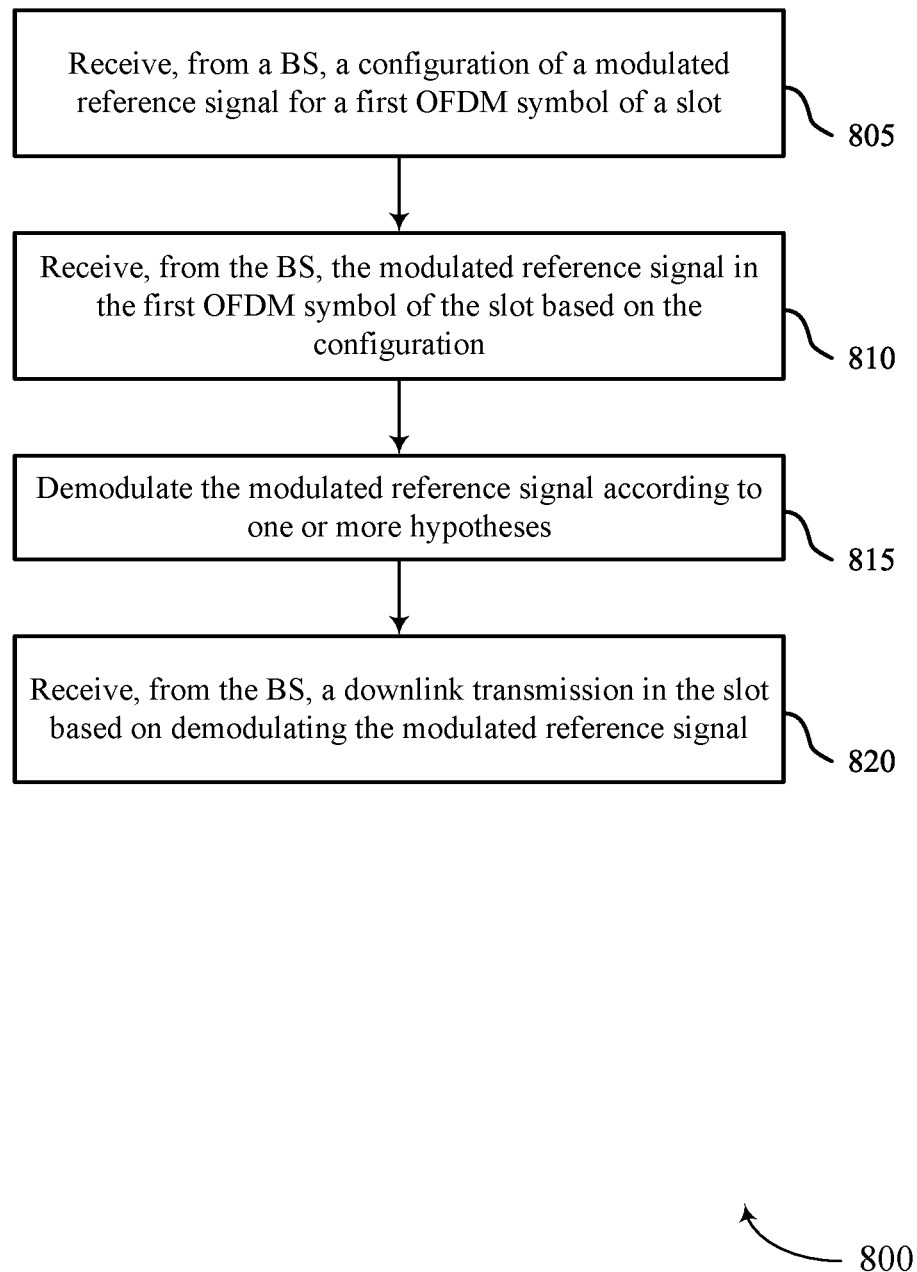
FIGS. 8 and 9 show flowcharts illustrating methods that support techniques for setting a quantity of bits for an adaptive low-resolution ADC in higher band operation.

FIG. 8 shows a flowchart illustrating a method 800 that supports techniques for setting a quantity of bits for an adaptive low-resolution ADC in higher band operation. The operations of the method 800 may be implemented by a UE or its components as described herein. For example, the operations of the method 800 may be performed by a UE 115 as described with reference to FIGS. 1-6. In some examples, a UE may execute a set of instructions to control the functional elements of the UE to perform the described functions. Additionally, or alternatively, the UE may perform aspects of the described functions using special-purpose hardware At 805, the method may include receiving, from a BS, a configuration of a modulated reference signal for a first OFDM symbol of a slot. In some examples, aspects of the operations of 805 may be performed by a communications manager 620 as described with reference to FIG. 6.

At 810, the method may include receiving, from the BS, the modulated reference signal in the first OFDM symbol of the slot based on the configuration. In some examples, aspects of the operations of 810 may be performed by a communications manager 620 as described with reference to FIG. 6.

At 815, the method may include demodulating the modulated reference signal according to one or more hypotheses. In some examples, aspects of the operations of 815 may be performed by a communications manager 620 as described with reference to FIG. 6.

At 820, the method may include receiving, from the BS, a downlink transmission in the slot based on demodulating the modulated reference signal. In some examples, aspects of the operations of 820 may be performed by a communications manager 620 as described with reference to FIG. 6.

Figure 9:
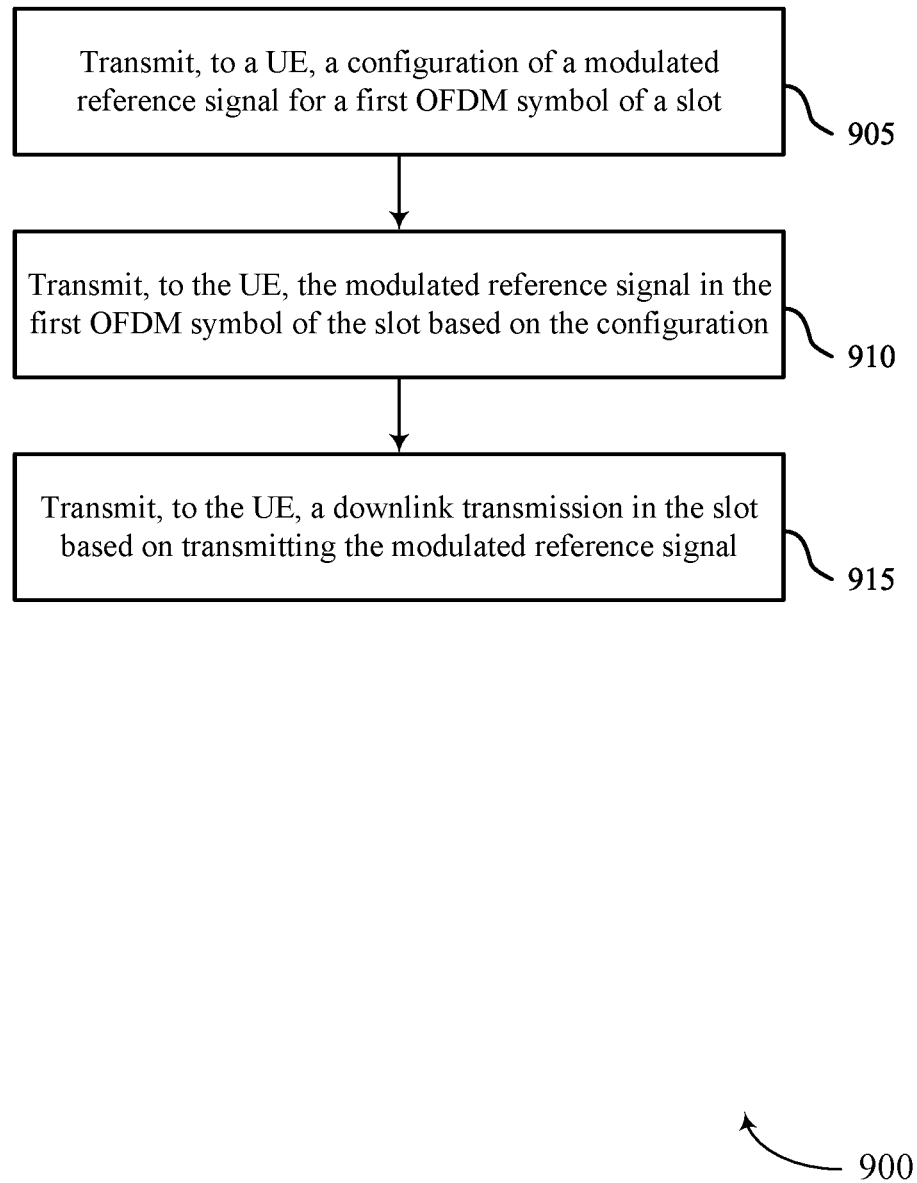

FIG. 9 shows a flowchart illustrating a method 900 that supports techniques for setting a quantity of bits for an adaptive low-resolution ADC in higher band operation. The operations of the method 900 may be implemented by a BS or its components as described herein. For example, the operations of the method 900 may be performed by a BS 105 as described with reference to FIGS. 1-5 and 7. In some examples, a BS may execute a set of instructions to control the functional elements of the BS to perform the described functions. Additionally, or alternatively, the BS may perform aspects of the described functions using special-purpose hardware.

At 905, the method may include transmitting, to a UE, a configuration of a modulated reference signal for a first OFDM symbol of a slot. In some examples, aspects of the operations of 905 may be performed by a communications manager 720 as described with reference to FIG. 7.

At 910, the method may include transmitting, to the UE, the modulated reference signal in the first OFDM symbol of the slot based on the configuration. In some examples, aspects of the operations of 910 may be performed by a communications manager 720 as described with reference to FIG. 7.

At 915, the method may include transmitting, to the UE, a downlink transmission in the slot based on transmitting the modulated reference signal. In some examples, aspects of the operations of 915 may be performed by a communications manager 720 as described with reference to FIG. 7.

The following provides an overview of some aspects of the present disclosure:

Aspect 1: A method for wireless communication at a UE, including: receiving, from a BS, a configuration of a modulated reference signal for a first OFDM symbol of a slot; receiving, from the BS, the modulated reference signal in the first OFDM symbol of the slot based at least in part on the configuration; demodulating the modulated reference signal according to one or more hypotheses; and receiving, from the BS, a downlink transmission in the slot based at least in part on demodulating the modulated reference signal.

Aspect 2: The method of aspect 1, where receiving the configuration of the modulated reference signal includes: receiving an allocation of a first portion of a first CP of the first OFDM symbol for the modulated reference signal in a time domain and a first frequency band equal to a second frequency band of the downlink transmission for the modulated reference signal in a frequency domain, where receiving the modulated reference signal is based at least in part on the allocation.

Aspect 3: The method of aspect 1, where receiving the configuration of the modulated reference signal includes: receiving an allocation of a first portion of a first CP of the first OFDM symbol for the modulated reference signal in a time domain and a first frequency band greater than a second frequency band of the downlink transmission for the modulated reference signal in a frequency domain, where receiving the modulated reference signal is based at least in part on the allocation.

Aspect 4: The method of aspect 1, where receiving the configuration of the modulated reference signal includes: receiving a symbol configuration splitting the first OFDM symbol into a second OFDM symbol and a third OFDM symbol and increasing a first SCS of the second OFDM symbol and the third OFDM symbol by a product of two relative to a second SCS of the first OFDM symbol.

Aspect 5: The method of aspect 4, where receiving the modulated reference signal includes: receiving the modulated reference signal in the second OFDM symbol based at least in part on the symbol configuration.

Aspect 6: The method of any of aspects 4 through 5, further including: receiving the modulated reference signal includes receiving an RNTI of the UE in at least a portion of the modulated reference signal; and demodulating the modulated reference signal includes demodulating at least the portion of the modulated reference signal.

Aspect 7: The method of aspect 1, where receiving the configuration of the modulated reference signal includes: receiving an allocation of a single carrier for the first OFDM symbol, where receiving the modulated reference signal is based at least in part on the allocation.

Aspect 8: The method of any of aspects 1 through 7, where receiving the configuration of the modulated reference signal includes: receiving an indication of a periodicity of the modulated reference signal, where receiving the modulated reference signal is based at least in part on the periodicity of the modulated reference signal.

Aspect 9: The method of any of aspects 1 through 8, further including: performing an AGC conversion based at least in part on demodulating the modulated reference signal, where receiving the downlink transmission in the slot is based at least in part on performing the AGC conversion.

Aspect 10: The method of aspect 9, further including: calibrating a first gain at an AGC of the UE based at least in part on sampling the modulated reference signal according to a first sampling rate; measuring a first energy of the modulated reference signal based at least in part on the first sampling rate; calibrating a second gain at the AGC of the UE based at least in part on sampling the modulated reference signal according to a second sampling rate lower than the first sampling rate; measuring a second energy of the modulated reference signal based at least in part on the second sampling rate; and estimating an interference at the UE from one or more other UEs based at least in part on the first energy and the second energy.

Aspect 11: The method of any of aspects 9 through 10, further including: measuring a first energy of at least a first portion of the modulated reference signal located in-band of a first frequency band of the downlink transmission; measuring a second energy of at least a second portion of the modulated reference signal located out-of-band of the first frequency band of the downlink transmission; and estimating an interference at the UE from one or more other UEs based at least in part on the first energy and the second energy.

Aspect 12: The method of any of aspects 1 through 11, further including: setting a resolution for an ADC based at least in part on the demodulating, where receiving the downlink transmission in the slot is based at least in part on setting the resolution for the ADC.

Aspect 13: The method of any of aspects 1 through 12, where receiving the modulated reference signal includes: receiving an indication of a MCS of the downlink transmission in the slot, a constellation of the downlink transmission, a quantity of bits associated with a resolution for an ADC of the UE, or a combination thereof.

Aspect 14: The method of any of aspects 1 through 13, where the one or more hypotheses include one or more correlator hypotheses, the method further including: selecting a peak correlation based at least in part on demodulating the modulated reference signal according to the one or more correlator hypotheses; and estimating a timing offset or a frequency offset based at least in part on selecting the peak correlation, where receiving the downlink transmission is based at least in part on the timing offset or the frequency offset.

Aspect 15: The method of any of aspects 1 through 14, where the demodulating of the modulated reference signal is based at least in part on a time domain sequence, the time domain sequence including at least one of a Zadoff-Chu sequence, a Gold sequence, or a Walsh Code.

Aspect 16: A method for wireless communication at a BS, including: transmitting, to a UE, a configuration of a modulated reference signal for a first OFDM symbol of a slot; transmitting, to the UE, the modulated reference signal in the first OFDM symbol of the slot based at least in part on the configuration; and transmitting, to the UE, a downlink transmission in the slot based at least in part on transmitting the modulated reference signal.

Aspect 17: The method of aspect 16, where transmitting the configuration of the modulated reference signal includes: transmitting an allocation of a first portion of a first CP of the first OFDM symbol for the modulated reference signal in a time domain and a first frequency band equal to a second frequency band of the downlink transmission for the modulated reference signal in a frequency domain, where transmitting the modulated reference signal is based at least in part on the allocation.

Aspect 18: The method of aspect 16, where transmitting the configuration of the modulated reference signal includes: transmitting an allocation of a first portion of a first CP of the first OFDM symbol for the modulated reference signal in a time domain and a first frequency band greater than a second frequency band of the downlink transmission for the modulated reference signal in a frequency domain, where transmitting the modulated reference signal is based at least in part on the allocation.

Aspect 19: The method of aspect 16, where transmitting the configuration of the modulated reference signal includes: transmitting a symbol configuration splitting the first OFDM symbol into a second OFDM symbol and a third OFDM symbol and increasing a first SCS of the second OFDM symbol and the third OFDM symbol by a product of two relative to a second SCS of the first OFDM symbol.

Aspect 20: The method of aspect 19, where transmitting the modulated reference signal includes: transmitting the modulated reference signal in the second OFDM symbol based at least in part on the symbol configuration.

Aspect 21: The method of any of aspects 19 through 20, where transmitting the modulated reference signal includes: transmitting a first RNTI of the UE in at least a first portion of the modulated reference signal; and transmitting a second RNTI of a second UE in at least a second portion of the modulated reference signal.

Aspect 22: The method of aspect 16, where transmitting the configuration of the modulated reference signal includes: transmitting an allocation of a single carrier for the first OFDM symbol, where transmitting the modulated reference signal is based at least in part on the allocation.

Aspect 23: The method of any of aspects 16 through 22, where transmitting the configuration of the modulated reference signal includes: transmitting an indication of a periodicity of the modulated reference signal, where transmitting the modulated reference signal is based at least in part on the periodicity of the modulated reference signal.

Aspect 24: The method of any of aspects 16 through 23, where transmitting the modulated reference signal includes: transmitting an indication of a MCS of the downlink transmission in the slot, a constellation of the downlink transmission, a quantity of bits associated with a resolution for an ADC of the UE, or a combination thereof.

Aspect 25: The method of any of aspects 16 through 24, where the modulated reference signal includes a time domain sequence including at least one of a Zadoff-Chu sequence, a Gold sequence, or a Walsh Code.

Aspect 26: An apparatus for wireless communication at a UE, including at least a first interface, a processing system, and a second interface configured to cause the apparatus to perform a method of any of aspects 1 through 15.

Aspect 27: An apparatus for wireless communication at a UE, including a processor; memory coupled with the processor; and instructions stored in the memory and executable by the processor to cause the apparatus to perform a method of any of aspects 1 through 15.

Aspect 28: An apparatus for wireless communication at a UE, including at least one means for performing a method of any of aspects 1 through 15.

Aspect 29: A non-transitory computer-readable medium storing code for wireless communication at a UE, the code including instructions executable by a processor to perform a method of any of aspects 1 through 15.

Aspect 30: An apparatus for wireless communication at a BS, including at least a first interface, a processing system, and a second interface configured to cause the apparatus to perform a method of any of aspects 16 through 25.

Aspect 31: An apparatus for wireless communication at a BS, including a processor; memory coupled with the processor; and instructions stored in the memory and executable by the processor to cause the apparatus to perform a method of any of aspects 16 through 25.

Aspect 32: An apparatus for wireless communication at a BS, including at least one means for performing a method of any of aspects 16 through 25.

Aspect 33: A non-transitory computer-readable medium storing code for wireless communication at a BS, the code including instructions executable by a processor to perform a method of any of aspects 16 through 25.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some examples, the actions recited in the claims can be performed in a different order and still achieve desirable results.

What is claimed is:

1. An apparatus for wireless communication at a user equipment (UE), comprising:
   a first interface configured to:
     obtain, from a base station (BS), a configuration of a modulated reference signal for a first orthogonal frequency division multiplexing (OFDM) symbol of a slot,
     the configuration indicating an allocation of:
       a first portion of a first cyclic prefix (CP) of the first OFDM symbol for the modulated reference signal in a time domain; and
       a first frequency band greater than or equal to a second frequency band of a downlink transmission for the modulated reference signal in a frequency domain;
   the first interface or a second interface configured to:
     obtain, from the BS, the modulated reference signal in the first OFDM symbol of the slot based at least in part on the configuration;
   a processing system configured to:
     demodulate the modulated reference signal according to one or more hypotheses; and
   the first interface or the second interface configured to:
     obtain, from the BS, the downlink transmission in the slot based at least in part on the modulated reference signal.

2. The apparatus of claim 1,
wherein the first frequency band is equal to the second frequency band of the downlink transmission for the modulated reference signal in the frequency domain.

3. The apparatus of claim 1,
wherein the first frequency band is greater than the second frequency band of the downlink transmission for the modulated reference signal in the frequency domain.

4. The apparatus of claim 1,
wherein the configuration includes a symbol configuration splitting the first OFDM symbol into a second OFDM symbol and a third OFDM symbol and increasing a first subcarrier spacing (SCS) of the second OFDM symbol and the third OFDM symbol by a product of two relative to a second SCS of the first OFDM symbol.

5. The apparatus of claim 4, wherein the first interface or the second interface configured to obtain the modulated reference signal is further configured to:
obtain the modulated reference signal in the second OFDM symbol based at least in part on the symbol configuration.

6. The apparatus of claim 4, wherein the first interface or the second interface configured to obtain the modulated reference signal is further configured to:
obtain a radio network temporary identifier (RNTI) of the UE in at least a portion of the modulated reference signal; and
wherein the processing system configured to demodulate the modulated reference signal is further configured to:
demodulate at least the portion of the modulated reference signal.

7. The apparatus of claim 1,
wherein the configuration includes an allocation of a single carrier for the first OFDM symbol.

8. The apparatus of claim 1,
wherein the configuration includes an indication of a periodicity of the modulated reference signal.

9. The apparatus of claim 1, wherein the processing system is further configured to:
perform an automatic gain control (AGC) conversion based at least in part on the modulated reference signal being demodulated, wherein the downlink transmission in the slot is obtained based at least in part on the AGC conversion.

10. The apparatus of claim 1, wherein the processing system is further configured to:
set a resolution for an analog-to-digital converter (ADC) based at least in part on the modulated reference signal being demodulated, wherein the downlink transmission in the slot is received based at least in part on the resolution for the ADC.

11. The apparatus of claim 1, wherein the first interface or the second interface configured to obtain the modulated reference signal is further configured to:
obtain an indication of a modulation and coding scheme (MCS) of the downlink transmission in the slot, a constellation of the downlink transmission, a quantity of bits associated with a resolution for an analog-to-digital converter (ADC) of the UE, or a combination thereof.

12. The apparatus of claim 1, wherein the one or more hypotheses comprise one or more correlator hypotheses, and wherein the processing system is further configured to:
select a peak correlation based at least in part on the modulated reference signal being demodulated according to the one or more correlator hypotheses; and
estimate a timing offset or a frequency offset based at least in part on the peak correlation, wherein the downlink transmission is obtained based at least in part on the timing offset or the frequency offset.

13. The apparatus of claim 1, wherein the modulated reference signal is demodulated based at least in part on a time domain sequence, the time domain sequence including at least one of a Zadoff-Chu sequence, a Gold sequence, or a Walsh Code.

14. An apparatus for wireless communication at a base station (BS), comprising:
a first interface configured to:
output, to a user equipment (UE), a configuration of a modulated reference signal for a first orthogonal frequency division multiplexing (OFDM) symbol of a slot,
the configuration indicating an allocation of:
a first portion of a first cyclic prefix (CP) of the first OFDM symbol for the modulated reference signal in a time domain; and
a first frequency band greater than or equal to a second frequency band of a downlink transmission for the modulated reference signal in a frequency domain;
the first interface or a second interface configured to:
output, to the UE, the modulated reference signal in the first OFDM symbol of the slot based at least in part on the configuration; and
output, to the UE, the downlink transmission in the slot based at least in part on the modulated reference signal.

15. The apparatus of claim 14,
wherein the first frequency band is equal to the second frequency band of the downlink transmission for the modulated reference signal in the frequency domain.

16. The apparatus of claim 14,
wherein the first frequency band is greater than the second frequency band of the downlink transmission for the modulated reference signal in the frequency domain.

17. The apparatus of claim 14,
wherein the configuration includes a symbol configuration splitting the first OFDM symbol into a second OFDM symbol and a third OFDM symbol and increasing a first subcarrier spacing (SCS) of the second OFDM symbol and the third OFDM symbol by a product of two relative to a second SCS of the first OFDM symbol.

18. The apparatus of claim 17, wherein the first interface or the second interface configured to output the modulated reference signal is further configured to:
output the modulated reference signal in the second OFDM symbol based at least in part on the symbol configuration.

19. The apparatus of claim 17, wherein the first interface or the second interface configured to output the modulated reference signal is further configured to:
output a first radio network temporary identifier (RNTI) of the UE in at least a first portion of the modulated reference signal; and
output a second RNTI of a second UE in at least a second portion of the modulated reference signal.

20. The apparatus of claim 14,
wherein the configuration includes an allocation of a single carrier for the first OFDM symbol.

21. The apparatus of claim 14,
wherein the configuration includes an indication of a periodicity of the modulated reference signal.

22. The apparatus of claim 14, wherein the first interface or the second interface configured to output the modulated reference signal is further configured to:

output an indication of a modulation and coding scheme (MCS) of the downlink transmission in the slot, a constellation of the downlink transmission, a quantity of bits associated with a resolution for an analog-to-digital converter (ADC) of the UE, or a combination thereof.

23. The apparatus of claim 14, wherein the modulated reference signal comprises a time domain sequence including at least one of a Zadoff-Chu sequence, a Gold sequence, or a Walsh Code.

24. A method for wireless communication at a user equipment (UE), comprising:

receiving, from a base station (BS), a configuration of a modulated reference signal for a first orthogonal frequency division multiplexing (OFDM) symbol of a slot,
  the configuration indicating an allocation of:
    a first portion of a first cyclic prefix (CP) of the first OFDM symbol for the modulated reference signal in a time domain; and
    a first frequency band greater than or equal to a second frequency band of a downlink transmission for the modulated reference signal in a frequency domain;
receiving, from the BS, the modulated reference signal in the first OFDM symbol of the slot based at least in part on the configuration;
demodulating the modulated reference signal according to one or more hypotheses; and
receiving, from the BS, the downlink transmission in the slot based at least in part on demodulating the modulated reference signal.

25. The method of claim 24,
wherein the first frequency band is equal to the second frequency band of the downlink transmission for the modulated reference signal in the frequency domain.

26. The method of claim 24,
wherein the first frequency band is greater than the second frequency band of the downlink transmission for the modulated reference signal in the frequency domain.

27. The method of claim 24, wherein receiving the configuration of the modulated reference signal comprises:

receiving a symbol configuration splitting the first OFDM symbol into a second OFDM symbol and a third OFDM symbol and increasing a first subcarrier spacing (SCS) of the second OFDM symbol and the third OFDM symbol by a product of two relative to a second SCS of the first OFDM symbol.

28. A method for wireless communication at a base station (BS), comprising:

transmitting, to a user equipment (UE), a configuration of a modulated reference signal for a first orthogonal frequency division multiplexing (OFDM) symbol of a slot,
  the configuration indicating an allocation of:
    a first portion of a first cyclic prefix (CP) of the first OFDM symbol for the modulated reference signal in a time domain; and
    a first frequency band greater than or equal to a second frequency band of a downlink transmission for the modulated reference signal in a frequency domain;
transmitting, to the UE, the modulated reference signal in the first OFDM symbol of the slot based at least in part on the configuration; and
transmitting, to the UE, the downlink transmission in the slot based at least in part on transmitting the modulated reference signal.

29. The method of claim 28,
wherein the first frequency band is equal to the second frequency band of the downlink transmission for the modulated reference signal in the frequency domain.

30. The method of claim 28,
wherein the first frequency band is greater than the second frequency band of the downlink transmission for the modulated reference signal in the frequency domain.

\* \* \* \* \*